US011356893B2

(12) United States Patent
Youn et al.

(10) Patent No.: US 11,356,893 B2
(45) Date of Patent: Jun. 7, 2022

(54) METHOD, USER DEVICE, AND NETWORK NODE FOR PERFORMING PDU SESSION ESTABLISHMENT PROCEDURE

(71) Applicant: LG Electronics Inc., Seoul (KR)

(72) Inventors: Myungjune Youn, Seoul (KR); Laeyoung Kim, Seoul (KR); Taehun Kim, Seoul (KR); Jinsook Ryu, Seoul (KR); Sangmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 16/959,870

(22) PCT Filed: Dec. 28, 2018

(86) PCT No.: PCT/KR2018/016856
§ 371 (c)(1),
(2) Date: Jul. 2, 2020

(87) PCT Pub. No.: WO2019/135560
PCT Pub. Date: Jul. 11, 2019

(65) Prior Publication Data
US 2020/0336937 A1    Oct. 22, 2020

Related U.S. Application Data

(60) Provisional application No. 62/613,757, filed on Jan. 4, 2018.

(51) Int. Cl.
*H04W 76/18* (2018.01)
*H04W 28/02* (2009.01)
(Continued)

(52) U.S. Cl.
CPC ......... *H04W 28/0289* (2013.01); *H04W 8/08* (2013.01); *H04W 48/16* (2013.01); *H04W 76/18* (2018.02); *H04W 76/38* (2018.02)

(58) Field of Classification Search
CPC . H04W 28/0289; H04W 76/18; H04W 76/38; H04W 8/08; H04W 48/16;
(Continued)

(56) References Cited

U.S. PATENT DOCUMENTS

2017/0303259 A1   10/2017   Lee et al.
2017/0366618 A1*  12/2017   Vrzic ................... H04L 67/148
(Continued)

FOREIGN PATENT DOCUMENTS

WO    WO2017/024005    2/2017

OTHER PUBLICATIONS

3GPP TS 23.501 V15.0.0, Technical Specification Group Services and System Aspects; System Architecture for the 5G System , Dec. 2017.*
3rd Generation Partnership Project; Technical Specification Group Services and System Aspects; "Procedures for the 5G System, Stage 2 (Release 15)," 3GPP TS 23.502 V15.0.0, dated Dec. 22, 2017, 259 pages.
(Continued)

*Primary Examiner* — Lakeram Jangbahadur
(74) *Attorney, Agent, or Firm* — Fish & Richardson P.C.

(57) ABSTRACT

A method for transmitting, by user equipment, a PDU session establishment request includes: receiving a session management message based on an SSC mode from an SMF through an AMF in a state in which a back-off timer associated with a DNN-based congestion control is in operation, wherein the session management message is associated with a DNN to which the DNN based congestion control is applied; and transmitting a PDU session establishment request to the AMF for establishment of a new PDU session associated with the DNN on the basis of the session management message. The PDU session establishment request includes information for preventing rejection of the PDU session establishment request, and the information for preventing the rejection may be used to make the AMF ignore
(Continued)

the DNN-based congestion control and transmit the PDU session establishment request to the SMF associated with the new PDU session.

12 Claims, 19 Drawing Sheets

(51) Int. Cl.
*H04W 76/38* (2018.01)
*H04W 8/08* (2009.01)
*H04W 48/16* (2009.01)

(58) Field of Classification Search
CPC . H04W 76/12; H04W 80/10; H04W 28/0263; H04W 76/50; H04W 8/18; H04W 48/06
See application file for complete search history.

(56) References Cited

U.S. PATENT DOCUMENTS

| | | | | |
|---|---|---|---|---|
| 2019/0150219 | A1* | 5/2019 | Wang | H04W 76/30 |
| | | | | 370/329 |
| 2019/0200208 | A1* | 6/2019 | Chandramouli | H04W 76/18 |
| 2020/0021970 | A1* | 1/2020 | Lu | H04W 68/04 |
| 2020/0053803 | A1* | 2/2020 | Youn | H04W 76/10 |
| 2020/0367149 | A1* | 11/2020 | Kang | H04W 28/02 |

OTHER PUBLICATIONS

3rd Generation Partnership Project; Technical Specification Group Services and System Aspects; "System Architecture for the 5G System, Stage 2 (Release 15)," 3GPP TS 23.501 V15.0.0, dated Dec. 22, 2017, 183 pages.

* cited by examiner

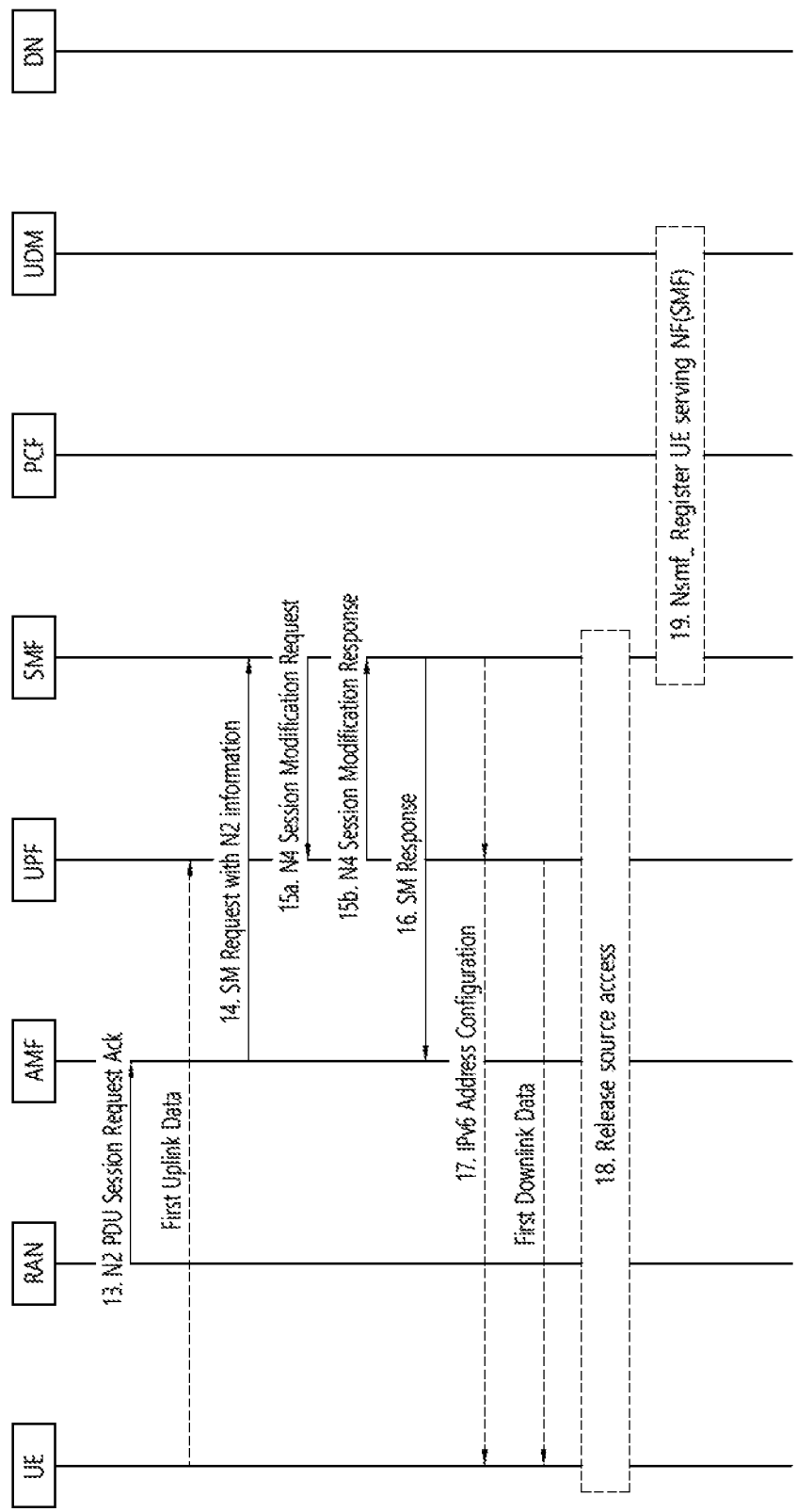

METHOD, USER DEVICE, AND NETWORK NODE FOR PERFORMING PDU SESSION ESTABLISHMENT PROCEDURE

CROSS-REFERENCE TO RELATED APPLICATIONS

This application is a National Stage application under 35 U.S.C. § 371 of International Application No. PCT/KR2018/016856, filed on Dec. 28, 2018, which claims the benefit of U.S. Provisional Application No. 62/613,757, filed on Jan. 4, 2018. The disclosures of the prior applications are incorporated by reference in their entirety.

BACKGROUND OF THE DISCLOSURE

Field of the Disclosure

The present disclosure relates to next generation mobile communication.

Related Art

In 3GPP, in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year of 2004.

The SAE, which has been performed based on 3GPP SA WG2, is a research regarding network technology that aims to determine the structure of a network and to support mobility between heterogeneous networks in line with an LTE task of a 3GPP TSG RAN and is one of the most recent important standardization issues of 3GPP. The SAE is a task for developing the 3GPP system into a system that supports various radio access technologies based on an IP, and the task has been carried out for the purpose of an optimized packet-based system, which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows an exemplary architecture of an evolved mobile communication network.

An Evolved Packet Core (EPC) may include various elements. FIG. 1 illustrates a Serving Gateway (S-GW) (52), a Packet Data Network Gateway (PDN GW) (53), a Mobility Management Entity (MME) (51), a Serving General Packet Radio Service (GPRS) Supporting Node (SGSN), and an enhanced Packet Data Gateway (ePDG) that correspond to some of the various elements.

The S-GW (52) is an element that operates at a boundary point between a Radio Access Network (RAN) and a core network and has a function of maintaining a data path between an eNodeB (22) and the PDN GW (53). Furthermore, if a user equipment (UE) moves in a region in which service is provided by the eNodeB (22), the S-GW (52) plays a role of a local mobility anchor point. That is, for mobility within an E-UTRAN (i.e., a Universal Mobile Telecommunications System (Evolved-UMTS) Terrestrial Radio Access Network defined after 3GPP Release-8), packets can be routed through the S-GW (52). Furthermore, the S-GW (52) may play a role of an anchor point for mobility with another 3GPP network (i.e., a RAN defined prior to 3GPP Release-8, e.g., a UTRAN or Global System for Mobile communication (GSM) (GERAN)/Enhanced Data rates for Global Evolution (EDGE) Radio Access Network).

The PDN GW (or P-GW) (53) corresponds to the termination point of a data interface toward a packet data network. The PDN GW (53) can support policy enforcement features, packet filtering, charging support, and so on. Furthermore, the PDN GW (or P-GW) (53) can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW (52) and the PDN GW (53) have been illustrated as being separate gateways, but the two gateways may be implemented in accordance with a single gateway configuration option.

The MME (51) is an element for performing the access of a terminal to a network connection and signaling and control functions for supporting the allocation, tracking, paging, roaming, handover, and so on, of network resources. The MME (51) controls control plane functions related to subscribers and session management. The MME (51) manages numerous eNodeBs (22) and performs conventional signaling for selecting a gateway for handover to another 2G/3G networks. Furthermore, the MME (51) performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U, S1-MME, and so on). In a 3GPP system, a conceptual link that connects two functions being present in the different function entities of an E-UTRAN and an EPC is defined as a reference point. Table 1 below describes the reference points shown in FIG. 1. In addition to the reference points shown in the example of Table 1, various reference points may be present depending on the network configuration.

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in Idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |

| Reference point | Description |
| --- | --- |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

<Next Generation mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps in any location. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is an exemplary diagram illustrating a predicted structure of a next generation mobile communication in terms of a node.

Referring to FIG. 2, the UE is connected to a data network (DN) through a next generation Radio Access Network (RAN).

The Control Plane Function (CPF) node shown in FIG. 3 may perform all or a part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node. The AMF may perform various functions including Non Access Stratum (NAS) Security and Idle State Mobility Handling. Additionally, the SMF may perform various functions including UE IP address allocation and PDU Session Control.

The user plane function (UPF) node shown in the figure is a type of a gateway over which user data is transmitted and received. The UPF node may perform all or part of the user plane functions of the S-GW and the P-GW of the fourth ($4^{th}$) generation mobile communication. The UPF may perform various functions including may perform various functions including Mobility Anchoring and PDU Handling.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, like a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

FIG. 3a is an exemplary diagram illustrating an architecture for supporting a multiple PDU session through two data networks. FIG. 3b is an exemplary diagram illustrating an architecture for supporting a concurrent access through two data networks.

FIG. 3a illustrates an architecture that allows a UE to simultaneously access two data networks using a multiple PDU session. Two SMFs may be selected for two different PDU sessions.

FIG. 3b illustrates an architecture that allows the UE to simultaneously access two data networks using one PDU session.

Additionally, FIG. 3a and FIG. 3b show various reference points (e.g., N1, N2, N3, and so on). In the 3GPP system, a conceptual link that connects two functions existing in different functional entities of a Next Generation-Radio Access Network (NG-RAN) and a 5G Core (5GC) network is defined as a reference point. Table 2 shown below describes the reference points shown in FIG. 3a and FIG. 3b. Apart from the examples shown in Table 2, other various reference points may exist depending upon the network structure.

TABLE 2

| Reference point | Description |
| --- | --- |
| N1 | Reference point between UE and AMF |
| N2 | Reference point between (R)AN and AMF |
| N3 | Reference point between (R)AN and UPF |
| N4 | Reference point between SMF and UPF |
| N5 | Reference point between PCF and AF |
| N6 | Reference point between UPF and Data Network (DN) |
| N7 | Reference point between SMF and PCF |
| N8 | Reference point between UDM and AMF |
| N10 | Reference point between UDM and SMF |
| N11 | Reference point between AMF and SMF |
| N12 | Reference point between AMF and AUSF |
| N13 | Reference point between UDM and AUSF |
| N15 | In a non-roaming scenario, reference point between PCF and AMF<br>In a roaming scenario, reference point between AMF and PCF of a visited network |
| N22 | Reference point between AMF and NSSF |

For reference, in Table 2, N5, N7, N8, N10, N11, N12, N13, N15, and N22 show interaction existing between Network Functions (NFs). These reference points are implemented by corresponding NF service-based interfaces. And, these reference points are implemented by specifying consumer and producer NF services in order to implement specific system procedures.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in relation with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

<Session and Service Continuity>

A next generation mobile communication network supports session and service continuity (SSC). The SSC support allows various continuity requirements of various applications and services to be resolved. In order to support SSC, the next generation mobile communication network provides various SSC modes of SSC Mode 1 to SSC Mode 3.

1) SSC Mode 1

In a PDU Session Establishment procedure, a UPF operating as a PDU session anchor is maintained regardless of the access technology (i.e., access type and cell). In case of an Internet Protocol (IP) type PDU session, IP continuity is supported regardless of the UE mobility. The SSC Mode 1 may be applied to any PDU Session type and may also be applied to any Access type.

2) SSC Mode 2

In case a PDU session has one PDU session anchor, the network may trigger a release (i.e., cancellation) of the PDU session and may instruct, to the UE, the establishment of a new PDU session for the same Data Network (DN). A condition for triggering the release of a PDU session depends upon the service provider policy (i.e., request from an AP, based on a load state, and so on). During the establishment procedure of a new PDU session, a UPF operating as the PDU session anchor may be newly selected. The SSC Mode 2 may be applied to any PDU Session type and may also be applied to any Access type.

3) SSC Mode 3

For a PDU session of SSC Mode 3, before releasing the connectivity between a UE and an old (or previous) PDU session anchor, the network may authorize a connection establishment of a UE using a new PDU session for the same Data Network. In case a trigger condition is applied, the network may determine whether or not to select a PDU session anchor, i.e., UPF, being appropriate for the new PDU condition of the UE. The SSC Mode 3 may be applied to any PDU Session type and may also be applied to any Access type.

Data Network Name (DNN) Based Congestion Control

DNN based congestion control is used to avoid and handling NAS signaling congestion of a UE using a specific DNN, regardless of Single Network Slice Selection Assistance Information (S-NSSAI). The UE and 5GC both support functions for providing DNN based congestion control.

The SMF may provide, to the UE, a back-off timer related to the DNN based congestion control and information on a DNN applying the DNN based congestion control. By transmitting, to the UE, a PDU Session Release Request message along with the back-off timer, the SMF may release (i.e., cancel) a PDU session belonging to the congested DNN.

If the DNN based congestion control is activated in an AMF, the AMF may provide a NAS Transport Error message for a NAS Transport message carrying a Session Management (SM) message. A DNN related to the back-off timer may be included in the NAS Transport Error message.

While a back-off timer for a specific DNN is being operated (or running), the UE does not transmit any NAS message related to the specific DNN.

However, while the back-off timer is being operated, in case the UE receives an SM Request message initiated by the network for the congested DNN, the UE shall respond to the corresponding SM Request message.

In a situation where DNN based congestion control is applied for a specific DNN (e.g., DNN #1), an SMF (e.g., SMF 1) may determine that a UPF of a PDU session related to DNN #1 needs to be changed. Accordingly, based on an SSC mode (SSC Mode 2 or SSC Mode 3) the SMF may request, to the UE, for a release of an existing PDU session for DNN #1, and the SMF may request, to the UE, for an establishment of a new PDU session for DNN #1.

Since the UE is required to respond to the SM Request message initiated by the network, in a situation where a back-off timer related to DNN #1 is being operated, the UE transmits a PDU Session Establishment request to the AMF. At this point, since a back-off timer is also being operated for the DNN #1 in the network, the AMF rejects the PDU Session Establishment request of the UE.

Even if the AMF transmits the PDU Session Establishment request to SMF 1 instead of rejecting the request, since a back-off timer for DNN #1 is being operated, SMF 1 rejects the PDU Session Establishment request. Additionally, even if the AMF selects an SMF (e.g., SMF 2) for a new PDU session instead of rejecting the PDU Session Establishment request, and, even if the AMF transmits a PDU Session Establishment request to SMF 2, since a back-off timer for DNN #1 is being operated, SMF 2 rejects the PDU Session Establishment request.

If a PDU Session Establishment request is rejected by an AMF or SMF, an existing PDU session for DNN #1 is released, and, since a new PDU session cannot be established, a problem may occur in that the UE cannot be provided with services for DNN #1.

SUMMARY OF THE DISCLOSURE

Technical Objects

The disclosures of the prevent description has been made in an effort to solve the above-described problems.

Technical Solutions

In order to achieve the above-described object, a disclosure of this specification provides a method for performing, by a user equipment (UE), a PDU Session Establishment procedure. The method may include the steps of, in a situation where a back-off timer related to Data Network Name (DNN)-based congestion control is being operated, receiving, from a Session Management Function (SMF), through an Access and Mobility Management Function (AMF), a Session Management message being based on a Session and Service Continuity (SSC) mode, wherein the Session Management message may be related to a DNN having the DNN-based congestion control applied thereto, and transmitting, to the AMF, a PDU Session Establishment Request for establishing a new PDU session related to the DNN, based on the Session Management message, wherein the PDU Session Establishment Request may include information for preventing rejection of the PDU Session Establishment Request, and wherein the information for preventing rejection may be used for enabling the AMF to ignore the DNN-based congestion control and to transmit, to an SMF being related to a new PDU session, a PDU Session Establishment Request.

Based on that the information for preventing rejection is transmitted, by the AMF, to an SMF related to the new PDU session, the information for preventing rejection may be used to enable the SMF related to the new PDU session to ignore the DNN-based congestion control and to accept the PDU Session Establishment Request.

In case the SSC mode is SSC Mode 2 in which the PDU Session Establishment procedure is performed after the PDU Session Release procedure, the Session Management message may include a PDU Session Release Request, and, in case the SSC mode is SSC Mode 3 in which the PDU Session Release procedure is performed after the PDU Session Establishment procedure, the Session Management message may include a PDU Session Release Request.

The PDU Session Establishment Request may be transmitted, to the AMF, in a case where the Session Management message does not include another back-off timer being related to the DNN-based congestion control.

The method may further include a step of receiving, from the SMF related to the new PDU session, through the AMF, a PDU Session establishment Accept message for the new PDU session.

The information for preventing rejection may include at least one of information notifying that the PDU Session Establishment Request has been transmitted in relation with the SSC mode, information notifying that the PDU Session Establishment Request has been transmitted upon a request made by the SMF, information requesting not to apply the DNN-based congestion control for the DNN, information notifying that the PDU Session Establishment Request is transmitted after an old PDU session for the DNN is released, information notifying that the old PDU session for the DNN is released after the PDU Session Establishment Request is transmitted, information notifying that the PDU Session Establishment Request is transmitted after the back-off timer related is stopped, information notifying that the DNN-based congestion control is overridden, and information notifying a priority level of the PDU Session Establishment Request.

In case the information for preventing rejection includes information notifying that the PDU Session Establishment Request is transmitted after the back-off timer related is stopped, the method may further include a step of receiving, from the SMF related to the new PDU session, through the AMF, another back-off timer being related to the DNN-based congestion control.

The information notifying a priority level of the PDU Session Establishment Request may include a pre-configured priority level value or a priority level value being configured, by the SMF, in the Session Management message, and the information notifying a priority level of the PDU Session Establishment Request may be used, by the SMF related to the new PDU session, for determining whether or not to accept the PDU Session Establishment Request.

In order to achieve the above-described object, a disclosure of this specification provides a user equipment (UE) performing a PDU Session Establishment procedure. The UE may include a transceiver, and a processor controlling the transceiver, wherein the processor is configured to: receive, in a situation where a back-off timer related to Data Network Name (DNN)-based congestion control is being operated, from a Session Management Function (SMF), through an Access and Mobility Management Function (AMF), a Session Management message being based on a Session and Service Continuity (SSC) mode, wherein the Session Management message may be related to a DNN having the DNN-based congestion control applied thereto, and transmit, to the AMF, a PDU Session Establishment Request for establishing a new PDU session related to the DNN, based on the Session Management message, wherein the PDU Session Establishment Request may include information for preventing reject (rejection) of the PDU Session Establishment Request, and wherein the information for preventing reject (rejection) may be used for enabling the AMF to ignore (or disregard) the DNN-based congestion control and to transmit, to an SMF being related to a new PDU session, a PDU Session Establishment Request.

In order to achieve the above-described object, a disclosure of this specification provides a method for performing, by a Session Management Function (SMF), a PDU Session Establishment procedure. The method may include the steps of, in a situation where a back-off timer related to Data Network Name (DNN)-based congestion control configured by a service provider is being operated, receiving, from a user equipment (UE), through an Access and Mobility Management Function (AMF), a PDU Session Establishment Request for establishing a PDU session related to a DNN having the DNN-based congestion control applied thereto, wherein the PDU Session Establishment Request may include information for preventing rejection of the PDU Session Establishment Request, and ignoring the DNN-based congestion control based on the information for preventing rejection, and transmitting, to the AMF, a PDU Session Establishment Accept message for the PDU session.

Effects of the Disclosure

According to a disclosure of this specification, the above-described problem of the related art is resolved.

BRIEF DESCRIPTION OF THE DRAWINGS

FIG. 4b is a signal flow chart showing an exemplary registration procedure continuing from FIG. 4a.

FIG. 5b is a signal flow chart showing an exemplary PDU Session Establishment procedure continuing from FIG. 5a.

DESCRIPTION OF EXEMPLARY EMBODIMENTS

Figure 1:
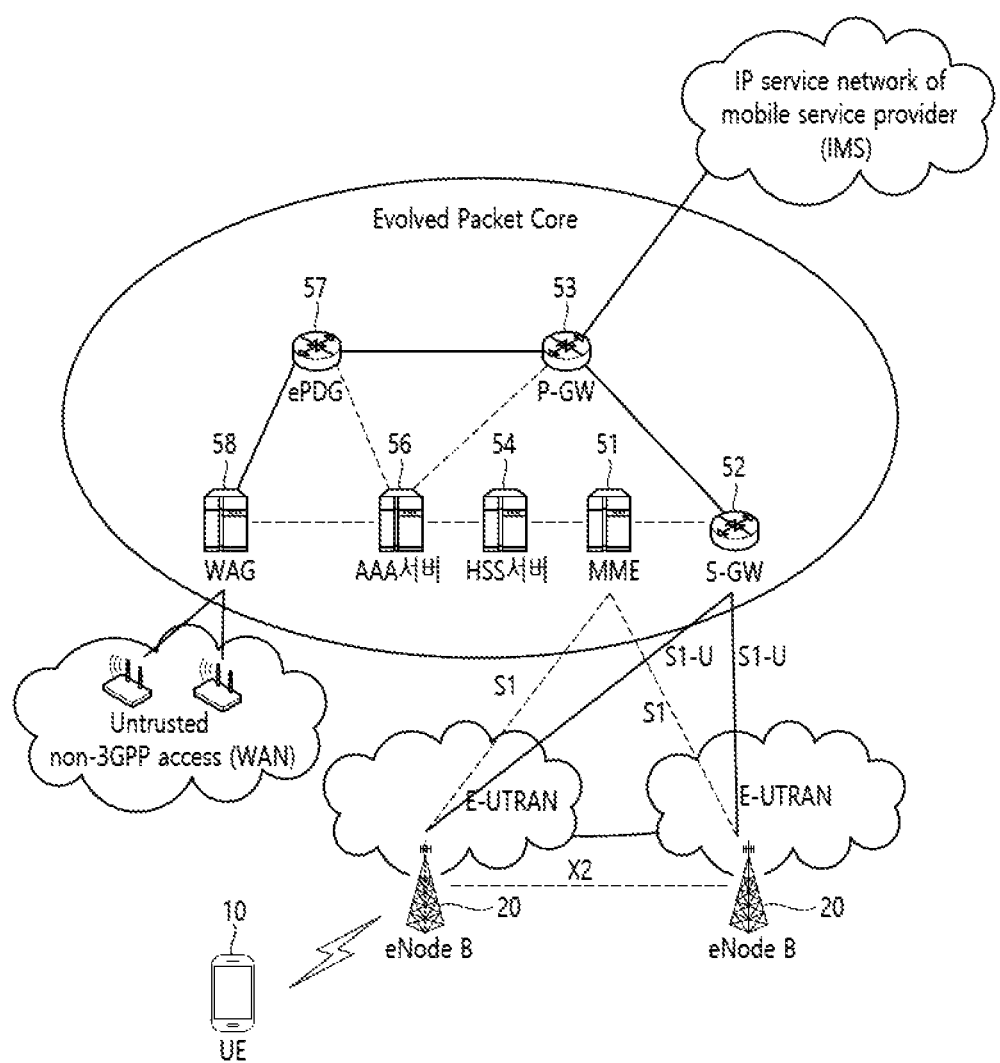
FIG. 1 shows an exemplary architecture of an evolved mobile communication network.
Figure 2:
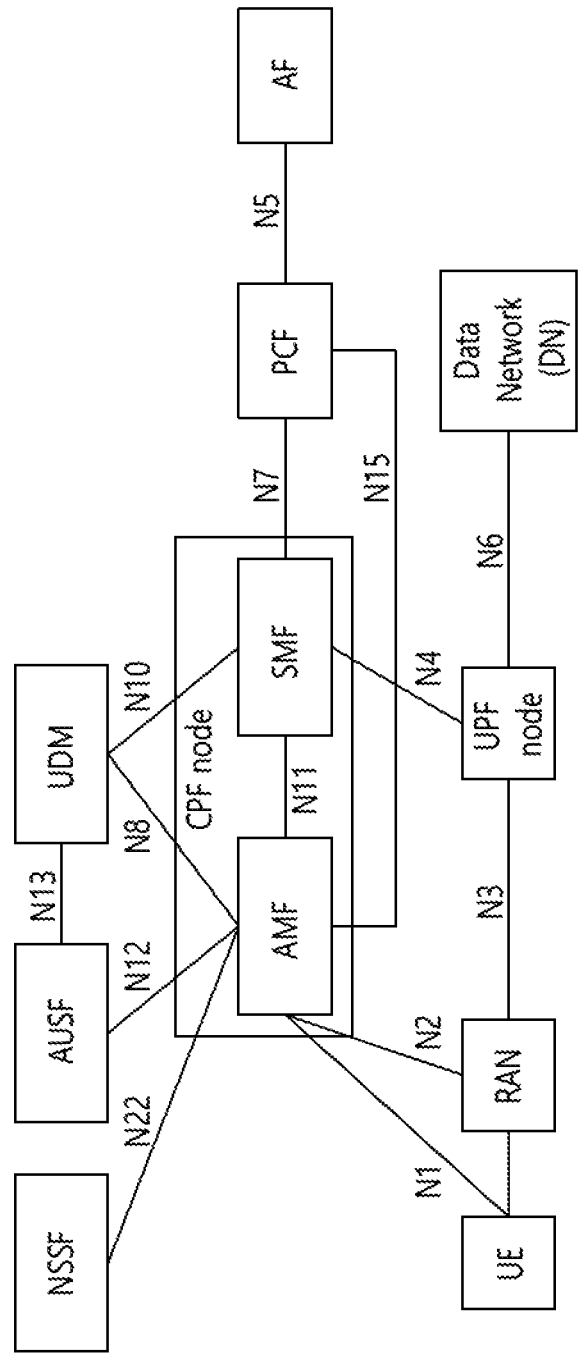
FIG. 2 is an exemplary diagram illustrating a predicted structure of a next generation mobile communication in terms of a node.
Figure 3A:
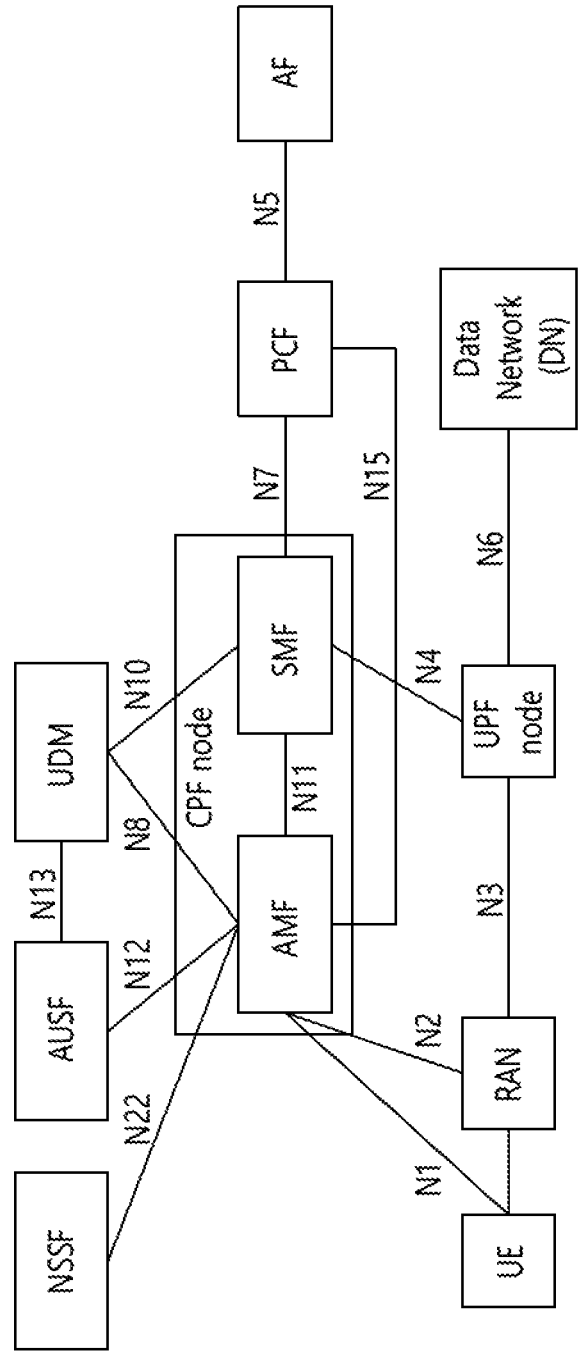
FIG. 3a is an exemplary diagram illustrating an architecture for supporting a multiple PDU session through two data networks.
Figure 3B:
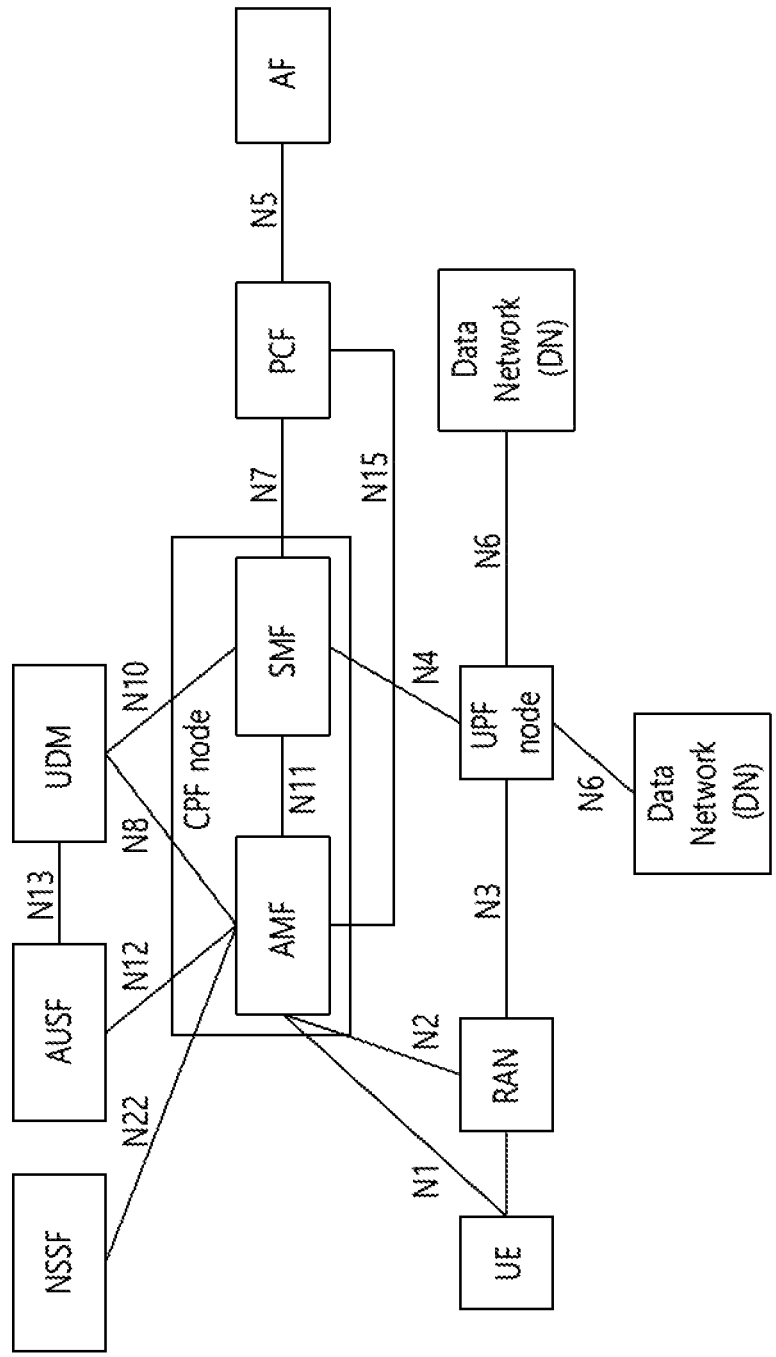
FIG. 3b is an exemplary diagram illustrating an architecture for supporting a concurrent access through two data networks.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the appended drawings, although a User Equipment (UE) is illustrated as an example, the UE shown in the drawings may be referred to as other terms, such as a UE (100) (terminal), a mobile equipment (ME), and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

The following description of this specification may be applied to a next-generation (also known as 5$^{th}$ generation or 5G) mobile communication network.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new tracking area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 4A:
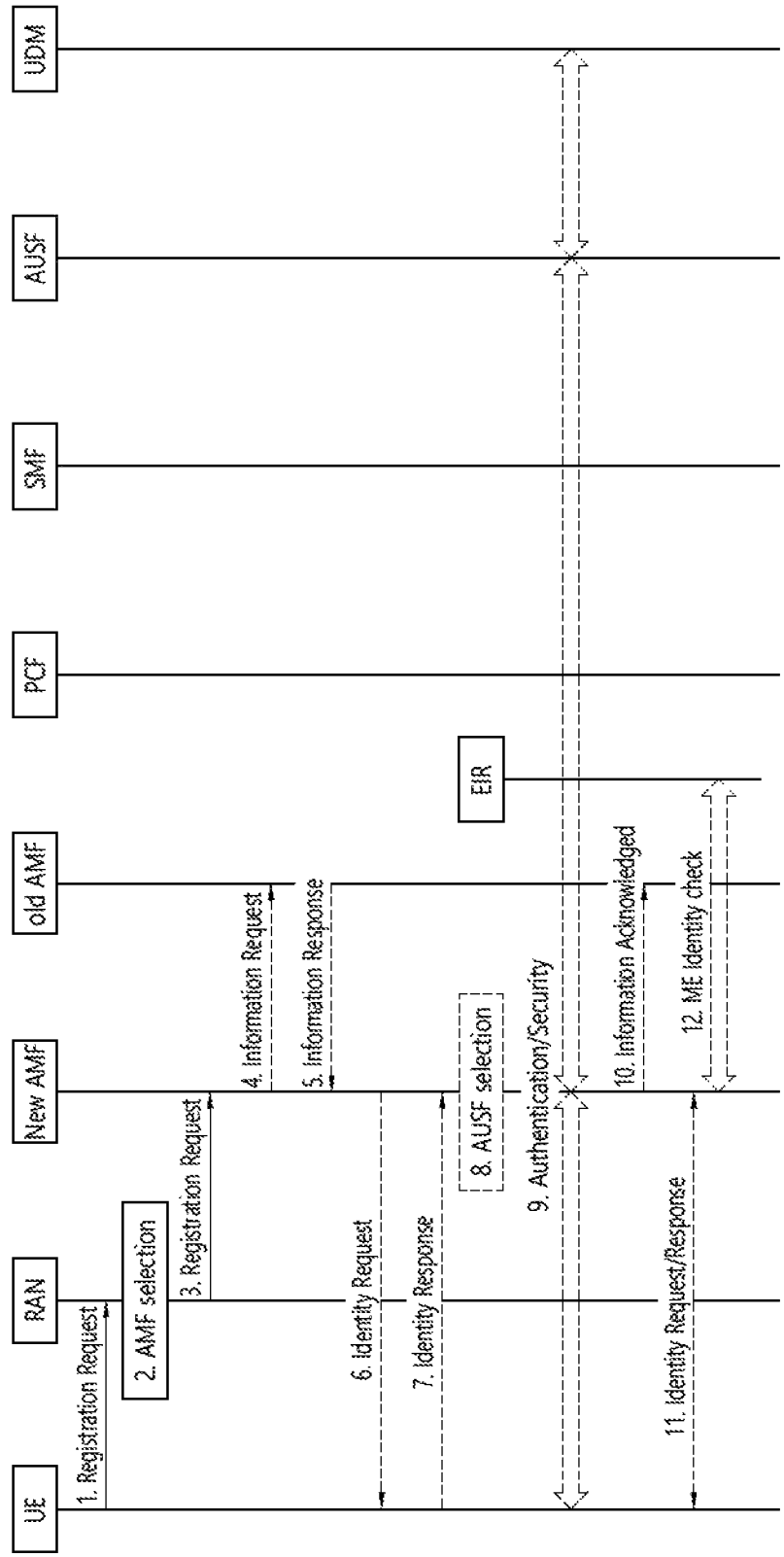
FIG. 4a is a signal flow chart showing an exemplary registration procedure.

FIG. 4a is a signal flow chart showing an exemplary registration procedure. And, FIG. 4b is a signal flow chart showing an exemplary registration procedure continuing from FIG. 4a.

Figure 4B:
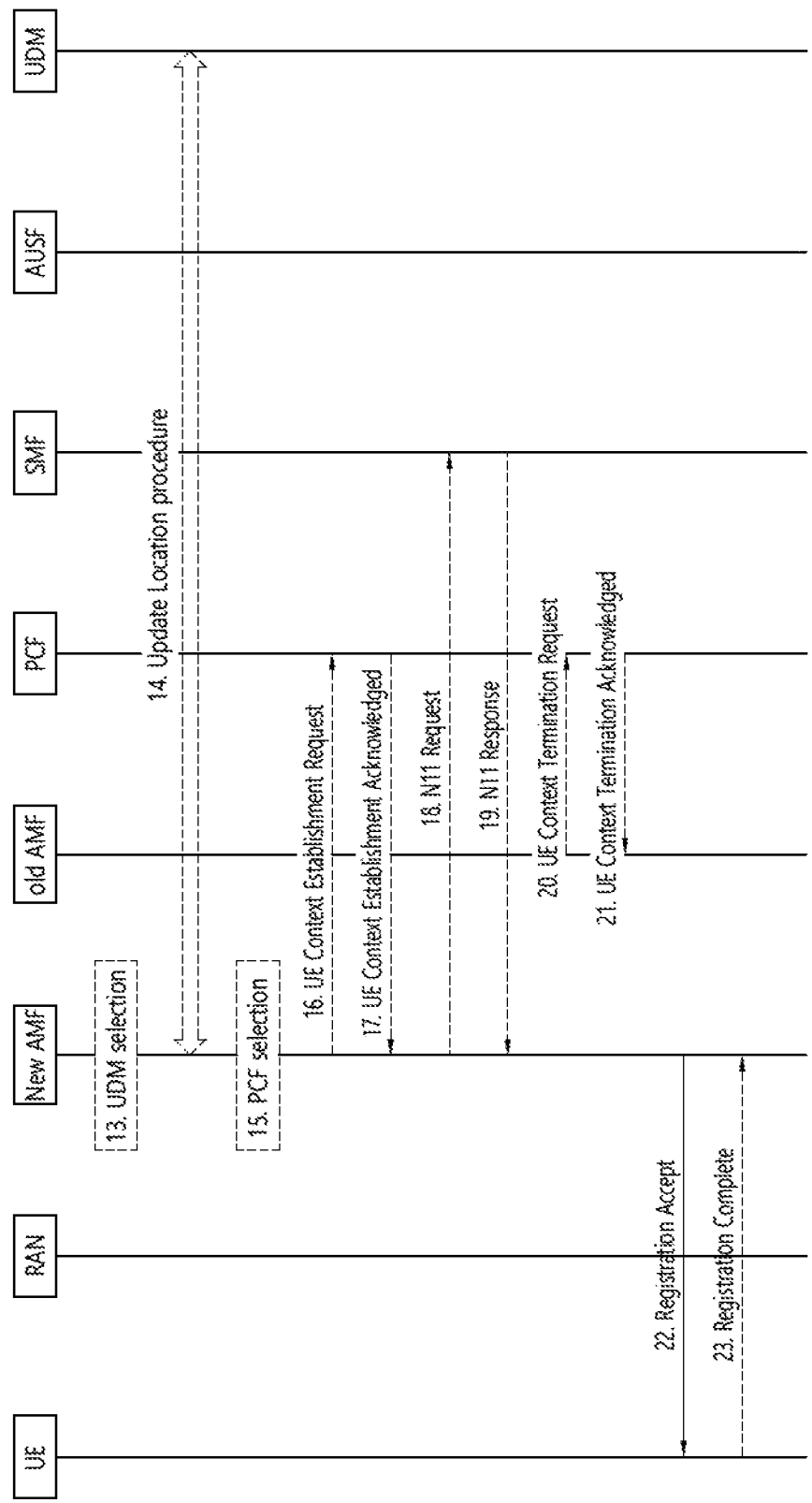

For reference, the registration procedure shown in FIG. 4a and FIG. 4b is exemplary, and, therefore, the scope of this specification will not be limited only to this. More specifically, the registration procedure may be performed while omitting the process steps shown in FIG. 4a and FIG. 4b, or the process steps shown in FIG. 4a and FIG. 4b may be modified and then performed, or process steps that are not shown in FIG. 4a and FIG. 4b may be performed along with the process steps shown in the drawings.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 5A:
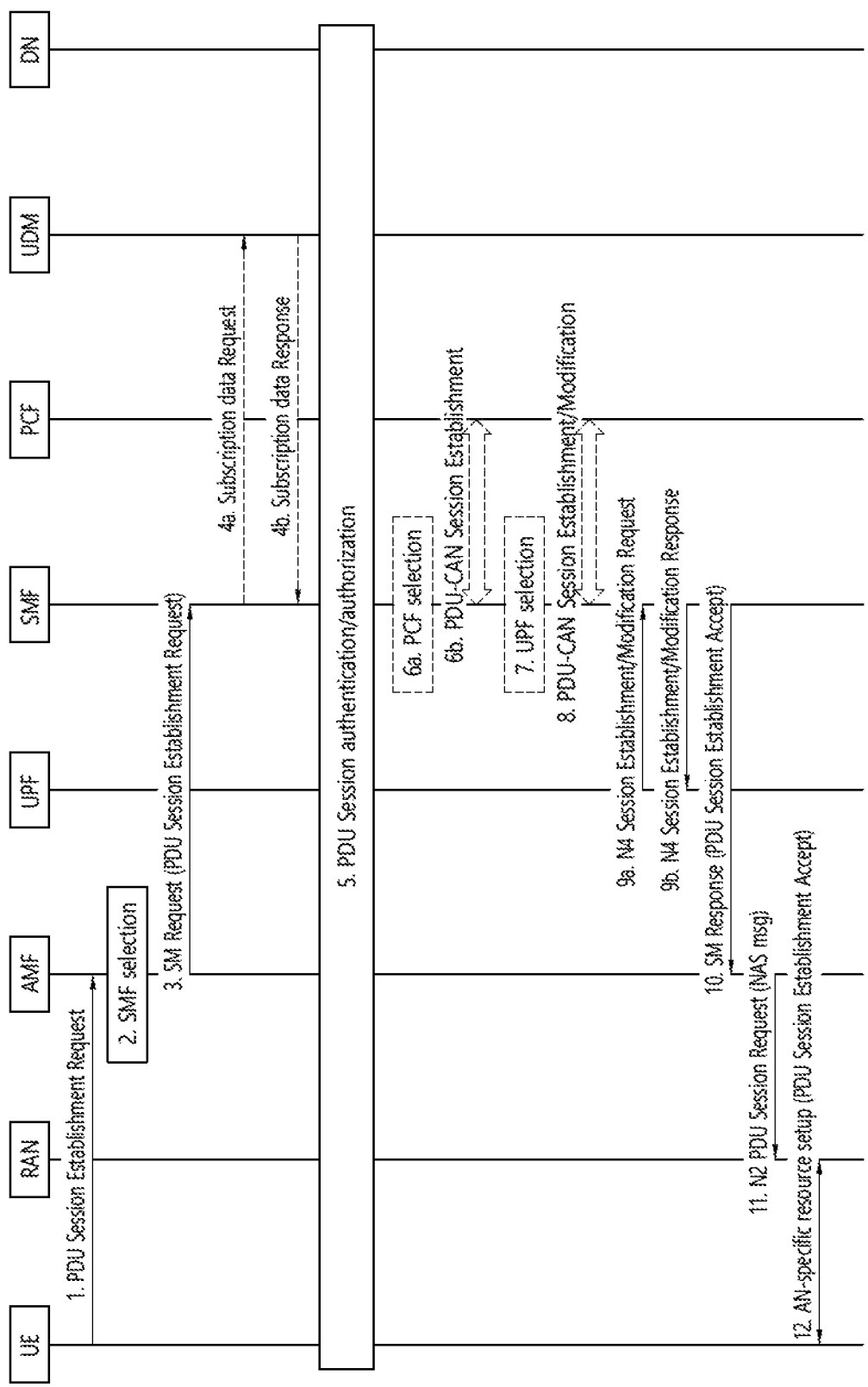
FIG. 5a is a signal flow chart showing an exemplary PDU Session Establishment procedure.

FIG. 5a is a signal flow chart showing an exemplary PDU Session Establishment procedure. And, FIG. 5b is a signal flow chart showing an exemplary PDU Session Establishment procedure continuing from FIG. 5a.

In the procedure shown in FIG. 5a and FIG. 5b, it will be assumed that, according to the Registration procedure shown in FIG. 4a and FIG. 4b, the UE has already been registered in the AMF. Therefore, it will be assumed that the AMF has already obtained the user subscriber data from the UDM. For reference, the PDU Session Establishment procedure shown in FIG. 5a and FIG. 5b is exemplary, and, therefore, the scope of this specification will not be limited only to this. More specifically, the PDU Session Establishment procedure may be performed while omitting the process steps shown in FIG. 5a and FIG. 5b, or the process steps shown in FIG. 5a and FIG. 5b may be modified and then performed, or process steps that are not shown in FIG. 5a and FIG. 5b may be performed along with the process steps shown in the drawings.

1) The UE transmits a NAS message to the AMF. The message may include Single-Network Slice Selection Assistance Information (S-NSSAI), DNN, PDU session ID, a Request type, N1 SM information (including PDU Session Request), and so on.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM Register UE serving NF service" including an SMF address and DNN. The UDM may store the ID, address, and DNN of the SMF.

During the procedure, if the PDU Session Establishment is not successful, the SMF notifies this to the AMF.

<Session and Service Continuity>

A next generation mobile communication network supports session and service continuity (SSC). The SSC support allows various continuity requirements of various applications and services to be resolved. In order to support SSC, the next generation mobile communication network provides various SSC modes of SSC Mode 1 to SSC Mode 3.

1) SSC Mode 1

In a PDU Session Establishment process, a UPF operating as a PDU session anchor is maintained regardless of the access technology (i.e., access type and cell). In case of an Internet Protocol (IP) type PDU session, IP continuity is supported regardless of the UE mobility. The SSC Mode 1 may be applied to any PDU Session type and may also be applied to any Access type.

2) SSC Mode 2

In case a PDU session has one PDU session anchor, the network may trigger a release (i.e., cancellation) of the PDU session and may instruct, to the UE, the establishment of a new PDU session for the same Data Network (DN). A condition for triggering the release of a PDU session depends upon the service provider policy (i.e., request from an AP, based on a load state, and so on). During the establishment procedure of a new PDU session, a UPF operating as the PDU session anchor may be newly selected. The SSC Mode 2 may be applied to any PDU Session type and may also be applied to any Access type.

3) SSC Mode 3

For a PDU session of SSC Mode 3, before releasing the connectivity between a UE and an old (or previous) PDU session anchor, the network may authorize a connection establishment of a UE using a new PDU session for the same Data Network. In case a trigger condition is applied, the network may determine whether or not to select a PDU session anchor, i.e., UPF, being appropriate for the new PDU condition of the UE. The SSC Mode 3 may be applied to any PDU Session type and may also be applied to any Access type.

4) Selection of SSC Mode

An SSC mode selection policy may be used in order to determine an SSC mode related to an application of a UE or an application group of a UE. The SSC mode selection policy may be included in a UE Route Selection Policy.

A service provider may provide the SSC mode selection policy to the UE. The policy may include one or more SSC mode selection policy rules. And, the policy may include a default SSC mode selection policy rule that is matched to all applications of the UE.

In case an application requests data transmission, and in case the application itself does not indicate the SSC mode it needs, the UE may determine an SSC mode related to this application by using the SSC mode selection policy. Additionally, the following operation may be applied to the UE and the network.

a) In case the UE has already established a PDU session being matched to an SSC mode related to the application, unless other conditions of the UE authorize the usage of this PDU session, the UE may perform routing of data of the application to this PDU session. In case a PDU session is not established, the UE may request a PDU Session Establishment for a new PDU session of an SSC mode being matched to the SSC mode related to the application.

b) An SSC mode related to an application may be an SSC mode being matched to an application in a non-default SSC mode selection policy rule. Alternatively, if a default SSC mode selection policy rule exists, the SSC mode related to the application may be an SSC mode being included in the default SSC mode selection policy. In case the SSC mode selection policy does not include a default SSC mode selection policy, and in case other rules are not matched to the application, the UE may not provide the SSC mode and may request a PDU session establishment. In this case, the network may determine the SSC mode of the PDU session.

The SSC mode selection policy rules may be provided to the UE and may be updated by the service provider.

An SMF may receive, from a UDM, a list of supported SSC modes and a default SSC mode per DNN of Single Network Slice Selection Assistance Information (S-NSSAI) as part of subscription information.

If the UE provides an SSC mode when requesting a new PDU session, the SMF may select an SSC mode by accepting the requested SSC mode. Alternatively, the SMF may also select an SSC mode by providing cause information including a cause value and by rejecting a PDU Session Establishment Request message.

Accordingly, the UE may re-attempt an Establishment request of a PDU session by using an SSC mode that is authorized for usage or by using another USRP, based on the cause value and the SSC mode(s) that is/are authorized for usage.

If the UE does not provide an SSC mode when requesting a new PDU session, the SMF may select a default SSC mode for a DNN listed in the subscription information. Alternatively, the SMF may select an SSC mode by applying a local configuration.

If a static IP address/prefix is allocated to a PDU session based on static IP address/prefix subscription information for DNN and S-NSSAI, SSC Mode 1 may be allocated to the PDU session.

For a PDU session of an Unstructured type or Ethernet type, the UE does not request SSC Mode 3, and the network does not allocate SSC Mode 3.

<Control Plane Load, Congestion, Overload Control>

Various measures are supported in order to ensure the operation of NFs within a 5G system under nominal capacity, which enables the NFs to provide sufficient services and connection to the UE, and to protect the 5G system from various conditions (peak operating rime, extreme conditions). The various measures include load (re-)balancing, overload control, and NAS level congestion control.

<NAS Level Congestion Control>

Herein, the NAS level congestion control may be generally applied (i.e., for all NAS messages) for DNN, for S-NSSAI, and for DNN and S-NSSAI. The NAS level congestion control is achieved by providing a back-off timer to the UE. In order to avoid a large number of UEs from (almost) simultaneously initiating requests that were delayed due to the back-off timer, 5GC shall select a back-off timer value so that the delayed requests are not synchronized.

When a UE receives a back-off timer, the UE shall not initiate any NAS signaling for the applied congestion control i) until the back-off timer is expired, or ii) until the UE receives a mobile terminated request from the network, or iii) until the UE initiates signaling for an emergency service or high-priority access.

Although AMFs and SMFs may apply the NAS level congestion control, AMFs and SMFs cannot apply the NAS level congestion control for high-priority access and emergency services.

Under a general overload condition, an AMF may reject NAS messages that are received from UEs using a random 5G Access Network (5G-AN). When a NAS request is rejected, an AMF may transmit a Mobility Management (MM) back-off timer to the UE, and, if a UE context is maintained, the AMF may store a back-off time per UE. Before the stored back-off time is expired, the AMF may immediately reject any subsequent requests being transmitted from the UE.

While the MM back-off timer is being operated, the UE cannot initiate any NAS request with the exception for a Deregistration procedure, a high-priority access, emergency services, and mobile terminated services. After such any Deregistration procedure is ended (or completed), the back-off timer continues to be operated.

While the MM back-off timer is being operated, if the UE is already in a Connection Management (CM)-CONNECTED state, the UE may perform registration for a mobility registration update. If the UE receives a paging request or NAS notification message from an AMF while the MM back-off timer is being operated, the UE shall stop the MM back-off timer and initiate a Service Request procedure or a Registration procedure for a mobility registration update.

The MM back-off timer shall not cause any influence on Cell/Radio Access Technology (RAT)/Access Type and Public Land Mobile Network (PLMN) change. A Cell/RAT and Tracking Area (TA) change does not stop the MM back-off timer. The MM back-off timer shall not be a trigger of a PLMN re-selection. The back-off timer is stopped when a new PLMN is being accessed, wherein the new PLMN is not an equivalent PLMN.

The AMF shall not reject any Registration Request message for the mobility registration update, which is performed when the UE is already in the CM-CONNECTED state. In case of a CM-IDLE state mobility, the AMF may reject a Registration Request message for the mobility registration update, and an MM back-off timer value may be included in a Registration Reject message. Herein, CM-CONNECTED is a state where the UE has a NAS signaling connection with an AMF via N1. And, CM-IDLE is a state where the UE does not have any NAS signaling connection established with the AMF via N1.

The AMF may reject a Registration Request message or a Service request along with the MM back-off timer. At this point, in case the MM back-off timer is greater than a summed value of a Periodic Registration Update timer and an Implicit Deregistration timer, by controlling a mobile reachable timer and/or an Implicit Deregistration timer, the AMF may prevent the UE from being unconditionally (or implicitly) processed with Registration cancellation while the MM back-off timer is being operated.

As a type of NAS level congestion control, DNN based congestion control is used.

<Data Network Name (DNN) Based Congestion Control>

DNN based congestion control is used to avoid and handling NAS signaling congestion of a UE using a specific DNN, regardless of Single Network Slice Selection Assistance Information (S-NSSAI). The UE and 5GC both support functions for providing DNN based congestion control.

By rejecting PDU Session Establishment/Modification Request messages, which are transmitted from a UE, along with a back-off timer and a DNN related to the back-off timer, the SMF may apply DNN based congestion control for the UE. By transmitting a PDU Session Release Request message, to the UE, along with the back-off timer, the SMF may release a PDU session belonging to a congested DNN. If a back-off timer is configured in the PDU Session Release Request message, a cause value of "Re-activation Requested" shall not be configured.

If the DNN based congestion control is activated in an AMF, the AMF may provide a NAS Transport Error message for a NAS Transport message carrying a Session Management (SM) message. A DNN related to the back-off timer may be included in the NAS Transport Error message. While a back-off timer for a specific DNN is being operated, the UE does not transmit any NAS message related to the specific DNN.

When a back-off timer for a DNN is received, the UE shall perform the following operations until the timer is expired.

In case a DNN related to a back-off timer is provided, the UE shall not initiate any SM procedure for a congested DNN. The UE may initiate SM procedures for other DNNs. When the UE moves to an EPS, the UE shall not initiate any SM procedure for an Access Point Name (APN) corresponding to the DNN.

In case a DNN related to the back-off timer is not provided, the UE does not initiate SM requests of a random PDU session type that does not have a DNN. The UE may initiate Session Management procedures having the DNN.

Cell/TA/PLMN/RAT change, a change in untrusted (or unreliable) non-3GPP access network, or a change in access type does/do not stop the back-off timer.

While the back-off timer is being operated, the UE may initiate SM procedures for emergency services and high-priority accesses.

In case the UE receives an SM Request message initiated by the network for a congested DNN while the back-off timer is being operated, the UE shall stop the SM back-off timer being related to this DNN and shall respond to the 5GC. Alternatively, the UE may not stop the SM back-off timer related to this DNN and may perform an override so as to respond to the 5GC.

The UE may initiate a PDU Session Release procedure (i.e., transmitting a PDU Session Release Request message) while the back-off timer is being operated. At this point, the UE does not delete the related back-off timer when releasing the connection of a PDU session.

The UE may support a separate back-off timer for all DNNs that may be used by the UE.

In order to avoid a large number of UEs from (almost) simultaneously initiating requests that were delayed due to the back-off timer, 5GC shall select a back-off timer value so that the delayed requests are not synchronized.

DNN based SM congestion control may be applied to NAS SM signaling of a control plane initiated by the UE. The SM congestion control does not stop (or block) the initiation of a data transmission/reception or Service Request procedure of the UE for activating a User Plane connection for a DNN, which is a target of the SM congestion control.

<Problems to be Resolved Through the Disclosures of This Specification>

For a specific DNN (e.g., DNN #1) used by a UE being provided with services from a 5G System (5GS), DNN based congestion control may be applied. At this point, the 5GC may provide an SM back-off timer to the UE, and the UE cannot request any additional SM Request (i.e., PDU Session Establishment Request, PDU Session Modification Request, and so on) to DNN #1 before the back-off timer is expired. While the back-off timer is being operated, the UE may receive Mobile Terminated (MT) signaling, which is a destination point of the UE.

The DNN-based SM back-off timer that is operated in the UE continues to be operated without being stopped even when the RAT/system is changed, and the DNN-based SM back-off timer of the UE continues to block additional SM requests for the same DNN or APN.

In a situation where DNN based congestion control is applied for a specific DNN (e.g., DNN #1) and where the UE has received an SM back-off timer, the network may transmit, to the UE, information or an indicator or message, which is based on an SSC mode (SSC Mode 2 or SSC Mode 3) of an existing (or old) PDU session for DNN #1. That is, when the SMF determines that a UPF or SMF serving the UE needs to be changed or relocated, the SMF may request, to the UE, to generate a new PDU session for DNN #1. Additionally, the SMF may request the existing (or old) PDU session for DNN #1 to be released. Accordingly, the UE may generate an SM request in accordance with the network's request transmit and may transmit the generated SM request to the network.

The UE transmits a new PDU Session Establishment Request for DNN #1 to an AMF. Thereafter, when the AMF receives the new request, since DNN #1 is a DNN being related to the SM back-off timer (i.e., a DNN having the DNN-based congestion control applied thereto), the AMF rejects the UE's request and provides the SM back-off timer to the UE.

In case the AMF does not reject the UE's request, the AMF may deliver a PDU Session Establishment Request to an SMF being related to the new PDU session. For example, the AMF may deliver a PDU Session Establishment Request to an SMF (e.g., SMF 1), which served the old PDU session. Alternatively, the AMF may select a new SMF (e.g., SMF 2) other than the SMF (e.g., SMF 1), which served the old PDU session, and may deliver a PDU Session Establishment Request to the new SMF. At this point, since SMF 1 or SMF 2 are not informed that UE has transmitted the PDU Session Establishment Request due to a Session Management message, which is based on the SSC Mode operation of SMF 1, SMF 1 or SMF 2 may reject the UE's request by applying the DNN-based congestion control for DNN #1. In other words, since the DNN-based congestion control for DNN #1 is applied, and since the back-off timer is being operated, SMF 1 or SMF 2 may reject the PDU Session Establishment Request.

Accordingly, a situation may occur where the old PDU session for DNN #1 is released and a new PDU session for DNN #1 cannot be established. Due to such situation, a problem may occur in that the UE cannot be proved with a service related to DNN #1.

Hereinafter, referring to FIG. 6 and FIG. 7, problems derived, by the inventors, for the situation related to SSC Mode 2 and SSC Mode 3 will be described in detail.

Figure 6:
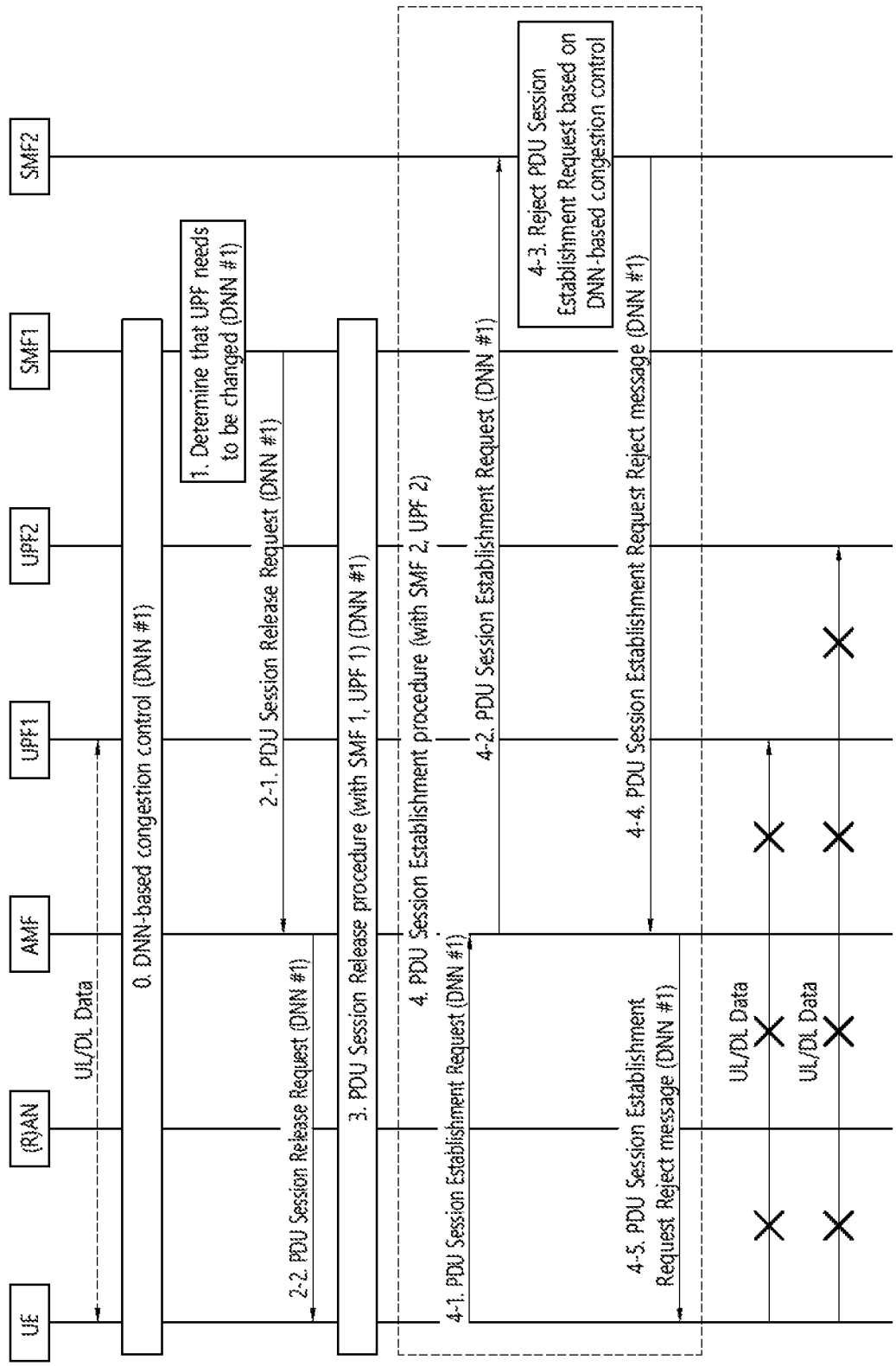
FIG. 6 is a signal flow chart showing a first example of a problem that is to be resolved by the disclosure of this specification.

FIG. 6 is a signal flow chart showing a first example of a problem that is to be resolved by the disclosure of this specification.

Referring to FIG. 6, problems that may occur in a situation related to SSC Mode 2 will be described in detail.

In case the SSC mode of the old PDU session for DNN #1 is SSC Mode 2, and when the network determines that a UPF change is needed, the network transmits a cause and indication to the UE while triggering a PDU Session Release procedure. Accordingly, the old session for DNN #1 is released, and the UE transmits the PDU Session Establishment Request, which is initiated by the UE, to the network.

More specifically, each step of the signal flow chart will be described in detail with reference to FIG. 6.

0) Since DNN #1 is congested, DNN-based congestion control is applied for DNN #1. Accordingly, SMF 1 may provide, to the UE, a back-off timer and information on DNN #1 (i.e., DNN-based congestion control application target) being related to the back-off timer, through an AMF.

1) SMF 1 may determine to change an anchor UPF (UPF 1) of the PDU session related to DNN #1 of the UE.

2-1, 2-2) In a situation where DNN-based congestion control for DNN #1 is being applied, SMF 1 may transmit a Session Management message, to the UE, through the AMF. The Session Management message includes a PDU Session Release Request. The PDU Session Release Request may include a PDU Session ID and Cause information. Herein, the Cause information include information indicating that a PDU Session Re-establishment for DNN #1 is needed.

3) UE, (R)AN, AMF, UPF 1, and SMF 1 may perform a PDU Session Release procedure, which releases the old PDU session for DNN #1. If the PDU Session Release procedure is completed, SMF 1 deletes all information on the old PDU session.

4) After releasing the old PDU session for DNN #1, in order to establish a new PDU session in accordance with the Cause information received from SMF 1, the UE may perform the PDU Session Establishment procedure together with AMF, UPF 2, and SMF2. The PDU Session Establishment procedure applies the procedure, which is described above with reference to FIG. 5a and FIG. 5b. SMF 2 is an SMF related to a new PDU session. For reference, although SMF 2 is illustrated as a separate entity from SMF 1 in the drawing, SMF 2 may be the same SMF as SMF 1, or SMF 2 may be a SMF that is different from SMF 1.

4-1) In the PDU Session Establishment procedure, the UE may transmit a PDU Session Establishment Request for DNN #1 to the AMF. The UE may transmit the PDU Session Establishment Request by including the request in a NAS message. In case the service provider configures the AMF and SMF as the subjects performing the DNN-based congestion control, since DNN #1 is the DNN-based congestion control application target, the AMF may reject the PDU Session Establishment Request. For reference, a case where the AMF rejects the PDU Session Establishment Request of the UE is a case where the service provider also applies an AMF-based congestion control. That is, this is a case where the service provider configures the AMF and the SMF as the subjects performing the DNN-based congestion control.

4-2) In case the AMF does not reject the PDU Session Establishment Request (i.e., in case the service provider does not configure the AMF as a subject performing the DNN-based congestion control), the AMF may select an SMF (i.e., SMF 2) being related to a new PDU session and may transmit the PDU Session Establishment Request to SFM 2. For reference, although SMF 2 is illustrated as a separate entity from SMF 1 in the drawing, SMF 2 may be the same SMF as SMF 1, or SMF 2 may be a SMF that is different from SMF 1.

4-3) Since the received PDU Session Establishment Request is a request related to DNN #1 having DNN-based congestion control applied thereto, SMF 2 may reject the PDU Session Establishment Request. For reference SMF 2 is provided with information on the DNN-based congestion control from the service provider. For example, SMF 2 receives a DNN having the DNN-based congestion control applied thereto and a back-off timer from the service provider. Even if SMF 2 and SMF 1 are the same, since SMF 2 is not informed that the current PDU Session Establishment Request is the PDU Session Establishment Request that is transmitted from the UE due to the Session message, which was transmitted by SMF 2, SMF 2 may apply the congestion control for DNN #1 and reject the PDU Session Establishment Request.

4-4, 4-5) Accordingly, SMF 2 may transmit a PDU Session Establishment Request Reject message for DNN #1, to the UE, through the AMF.

Since the old PDU session for DNN #1 is released, the UE cannot perform Uplink (UL) data transmission and Downlink (DL) data reception for DNN #1 with UPF 1. Additionally, since a new PDU Session Establishment Request for DNN #1 has also been rejected, the UE cannot perform Uplink (UL) data transmission and Downlink (DL) data reception for DNN #1 with UPF 2. Therefore, a problem may occur in that the UE cannot be provided with services for DNN #1.

Figure 7:
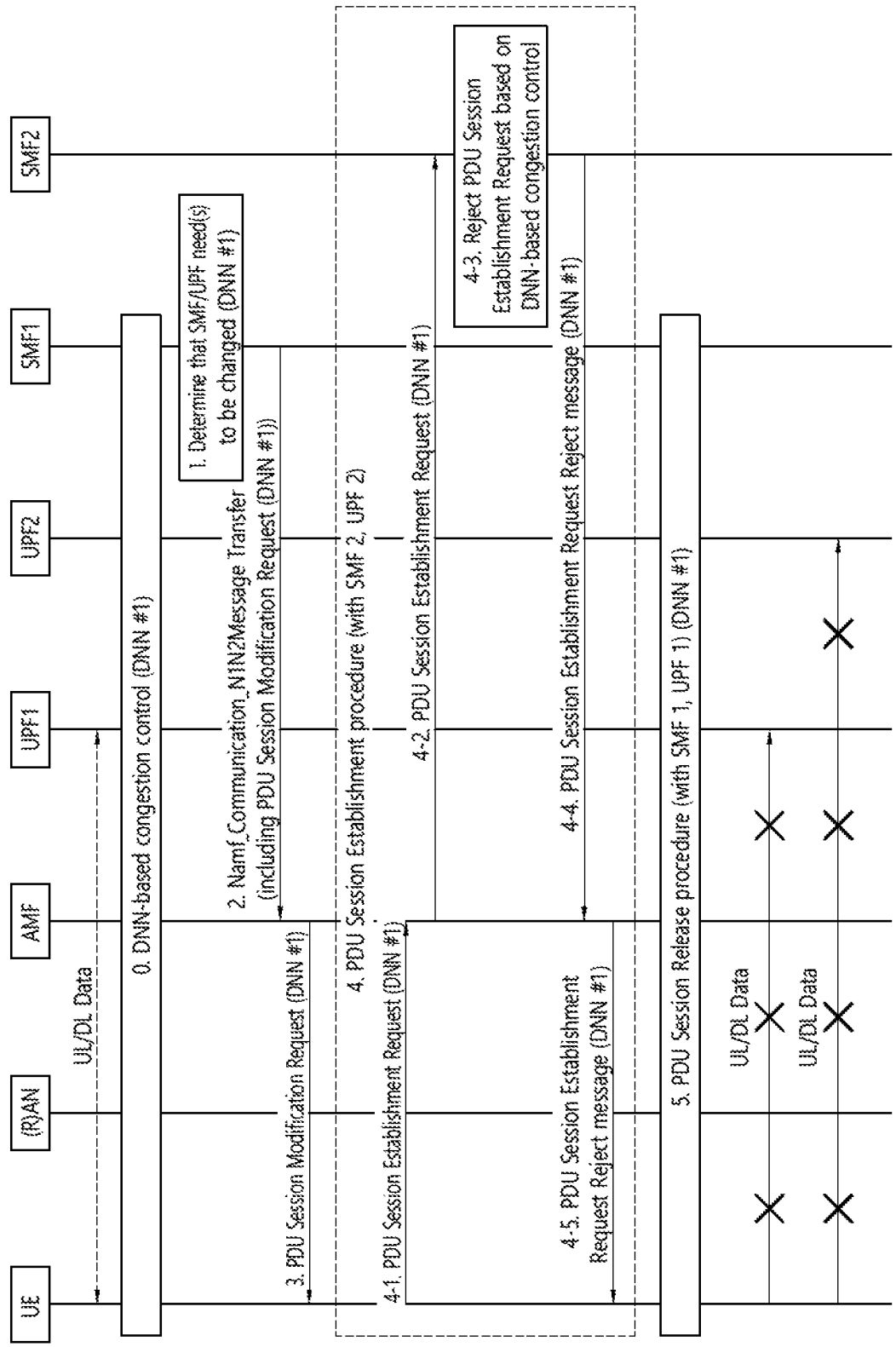
FIG. 7 is a signal flow chart showing a second example of a problem that is to be resolved by the disclosure of this specification.

FIG. 7 is a signal flow chart showing a second example of a problem that is to be resolved by the disclosure of this specification.

Referring to FIG. 7, problems that may occur in a situation related to SSC Mode 3 will be described in detail. Description for the part(s) that is/are the same as the description of FIG. 6 will be omitted, and, therefore, FIG. 7 will be described while concentrating on the details of FIG. 7 that are different from FIG. 6. For reference, although SMF 2 is illustrated as a separate entity from SMF 1 in the drawing, SMF 2 may be the same SMF as SMF 1, or SMF 2 may be a SMF that is different from SMF 1.

In case the SSC mode of the old PDU session for DNN #1 is SSC Mode 3, and when the network determines that a UPF or SMF change is needed, the network may transmit a PDU Session Modification Request for DNN #1 to the UE. The PDU Session Modification Request includes information instructing to create a new PDU session for DNN #1 and a timer for a time point at which the old PDU session for DNN #1 is released. Accordingly, the UE transmits the PDU Session Establishment Request for DNN #1 to the network and relocates all traffic of the old PDU session to the new PDU session before the timer is expired. In case all traffic has been relocated to the new PDU session before the timer is expired, the UE transmits, to the network, a PDU Session Release Request releasing the old PDU session for DNN #1. In case the UE does not make a PDU Session Release Request until the timer is expired, the SMF releases the old PDU session.

More specifically, each step of the signal flow chart will be described in detail with reference to FIG. 7.

0) DNN-based congestion control is applied for DNN #1.

1) SMF 1 may determine to change an anchor UPF (UPF 1) of the PDU session related to DNN #1 of the UE or may determine to change an SMF (SMF 1) of the PDU session.

2) In a situation where DNN-based congestion control for DNN #1 is being applied, SMF 1 may transmit a Session Management message, to the UE, through the AMF. The Session Management message includes a PDU Session Modification Request, and the PDU Session Modification Request may include Cause information and a PDU Session Release timer. The Cause information includes information indicating that a PDU Session Re-establishment for DNN #1 is needed.

3) The AMF may transmit a PDU Session Modification Request to the UE.

4) If the UE receives a PDU Session Modification Request, the UE may perform a PDU Session Establishment procedure for DNN #1 together with the AMF, UPF 2, and SMF 2, in order to establish a new PDU session in accordance with the Cause information received from SMF 1. SMF 2 may be an SMF related to the new PDU session. For reference, although SMF 2 is illustrated as a separate entity from SMF 1 in the drawing, SMF 2 may be the same SMF as SMF 1, or SMF 2 may be a SMF that is different from SMF 1.

4-1) In the PDU Session Establishment procedure, in response to step 1) of FIG. 5, the UE may generate a new PDU Session ID related to DNN #1 in accordance with the SSC mode, and the UE may use the new PDU Session ID so as to transmit the PDU Session Establishment Request. Accordingly, since DNN-based congestion control is applied to DNN #1, the AMF may reject the PDU Session Establishment Request of the UE. For reference, a case where the AMF rejects the PDU Session Establishment Request of the UE is a case where the service provider also applies an AMF-based congestion control. That is, this is a case where the service provider configures the AMF and the SMF as the subjects performing the DNN-based congestion control.

In case the AMF does not reject the PDU Session Establishment Request (i.e., in case the service provider does not configure the AMF as a subject performing the DNN-based congestion control), in response to step 2) of FIG. 5a and FIG. 5b, the AMF may select an SMF (i.e., SMF 2) that is different from SMF 1. In case the SMF is not changed, the AMF may transmit a PDU Session Establishment Request to an SMF (i.e., SMF 1) serving an old PDU Session ID.

4-2) In response to step 3) of FIG. 5a and FIG. 5b, the AMF may transmit, to SMF 2, a PDU Session Establishment Request after including a PDU Session ID (including a new PDU Session ID) and an Old PDU Session ID (including the existing (or old) PDU Session ID) in the corresponding request.

4-3) Since the received PDU Session Establishment Request is a request related to DNN #1 having DNN-based congestion control applied thereto, SMF 2 rejects the PDU Session Establishment Request.

4-4, 4-5) Accordingly, SMF 2 may transmit a PDU Session Establishment Request Reject message for DNN #1, to the UE, through the AMF. Even if SMF 2 and SMF 1 are the same, since SMF 2 is not informed that the current PDU Session Establishment Request is the PDU Session Establishment Request that is transmitted from the UE due to the Session message, which was transmitted by SMF 2, SMF 2 may apply the congestion control for DNN #1 and reject the PDU Session Establishment Request.

5) If the PDU Session Release timer is expired, SMF 1 initiates a PDU Session Release procedure for DNN #1. If the PDU Session Release procedure is completed, SMF 1 deletes all information on the old PDU session.

Since the old PDU session for DNN #1 is released, the UE cannot perform Uplink (UL) data transmission and Downlink (DL) data reception for DNN #1 with UPF 1. Additionally, since a new PDU Session Establishment Request for DNN #1 has also been rejected, the UE cannot perform Uplink (UL) data transmission and Downlink (DL) data reception for DNN #1 with UPF 2. Therefore, a problem may occur in that the UE cannot be provided with services for DNN #1.

<Disclosure of this Specification>

A method for transmitting a PDU Session Establishment Request, which is proposed in this specification, is configured by including a combination of one or more of the following operation(s)/configuration(s)/step(s). And, a method for performing a PDU Session Establishment procedure, which is proposed in this specification, is configured by including a combination of one or more of the following operation(s)/configuration(s)/step(s). Furthermore, the devices (UE, AMF, SMF, and so on), which are proposed in this specification, perform operations including a combination of one or more of the following operation(s)/configuration(s)/step(s).

I. PDU Session Establishment Procedure Based on SSC Mode

Figure 8:
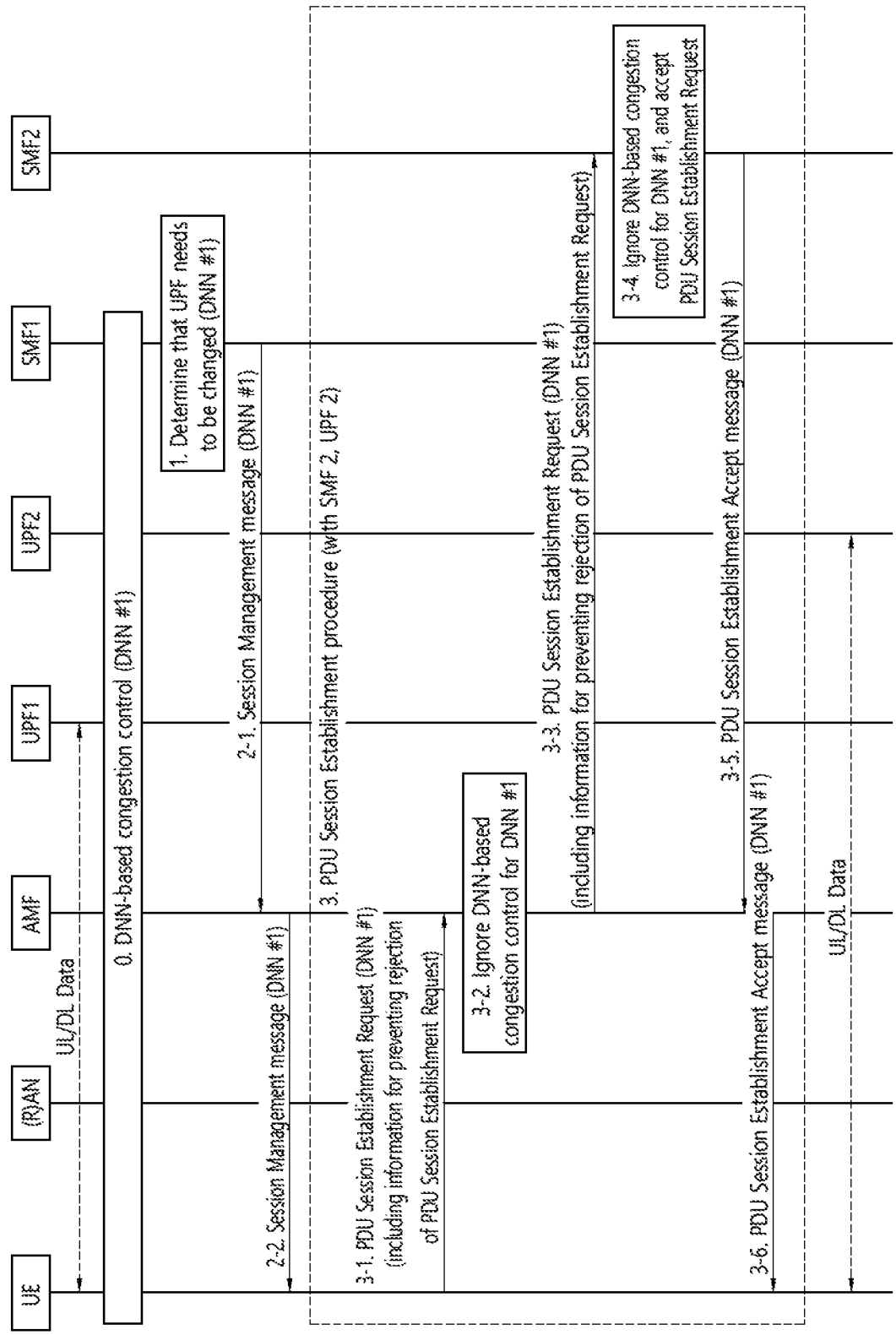
FIG. 8 is a flow chart showing a PDU Session Establishment procedure based on an SSC mode according to a disclosure of this specification.

FIG. 8 is a flow chart showing a PDU Session Establishment procedure based on an SSC mode according to a disclosure of this specification.

Referring to FIG. 8, in a situation where DNN-based congestion control is being applied in accordance with a disclosure of this specification, a PDU Session Establishment procedure based on an SSC mode will be described in detail. FIG. 8 describes a procedure in which SSC Mode 2 and SSC Mode 3 are commonly performed, and the procedures being performed in each of SSC Mode 2 and SSC Mode 3 with be described with reference to FIG. 9 and FIG. 10, respectively.

0) In case DNN #1 is congested, the network applies DNN-based congestion control for DNN #1. Accordingly, SMF 1 may provide, to the UE, a back-off timer and information on DNN #1 (i.e., DNN-based congestion control application target) being related to the back-off timer, through an AMF. The UE operates the received back-off timer. The UE cannot initiate, on its own, transmission of an SM request for DNN #1 before the received back-off timer is expired.

1) SMF 1 may determine to change an anchor UPF (UPF 1) of the PDU session related to DNN #1 of the UE. For example, in case useful events occur when the UPF is changed, SMF 1 may determine that the UPF needs to be changed.

2-1, 2-2) In a situation where DNN-based congestion control is being applied for DNN #1, SMF 1 may transmit a Session Management message, to the UE, through the AMF, based on the SSC mode of the PDU session related to DNN #1.

Even if DNN-based congestion control is applied for DNN #1, SMF 1 may transmit a Session Management message without including a back-off timer in the Session Management message. More specifically, in the related art, the SMF transmits a back-off timer by including the back-off timer in a Reject message for an SM message (e.g., PDU Session Establishment Request), which is transmitted from the UE, or the SMF transmits the back-off timer by including the back-off timer in the PDU Session Release Request. However, by having SMF 1 according to the disclosure of this specification transmit the Session Management message without including the back-off timer in the Session Management message, the UE stops the back-off timer and enables a subsequent PDU Session Establishment procedure to be performed.

Herein, the Session Management message includes a PDU Session Release Request or a PDU Session Modification Request. In case the SSC Mode of the PDU Session related to DNN #1 is SSC Mode 2, the Session Management message includes a PDU Session Release Request. And, in case the SSC Mode of the PDU Session related to DNN #1 is SSC Mode 3, the Session Management message includes a PDU Session Modification Request.

The PDU Session Release Request may include a PDU Session ID and Cause information. Herein, the Cause information includes information indicating that a PDU Session Re-establishment for DNN #1 is needed.

The PDU Session Modification Request may include Cause information and a PDU Session Address Lifetime value. Additionally, the PDU Session Modification Request may also include a PDU Session Release timer. The Cause information includes information indicating that a PDU Session Re-establishment for DNN #1 is needed.

In a situation where the back-off timer related to the DNN-based congestion control for DNN #1 is in an operating state, the UE may receive a Session Management message, which is based on the SSC mode.

3) The UE may initiate a PDU Session Establishment procedure based on a Session Management message, which is based on the SSC mode, received from SMF 1 through the AMF. The PDU Session Establishment procedure applies the procedure, which is described above with reference to FIG. 5a and FIG. 5b. However, this is merely exemplary, and, therefore, the scope of the PDU Session Establishment procedure in this specification includes all procedures that can establish a new PDU session.

In case the SSC mode of the existing (or old) PDU session is SSC Mode 2, the PDU Session Release procedure may be performed before the PDU Session Establishment procedure is initiated. This is described in detail in FIG. 9. In case the SSC mode of the existing (or old) PDU session is SSC Mode 3, the PDU Session Release procedure may be performed after the PDU Session Establishment procedure. This is described in detail in FIG. 10.

3-1) In order to establish a new PDU Session related to DNN #1, a PDU Session Establishment Request may be transmitted to the AMF. More specifically, since the Cause information included in the Session Management message includes information indicating that a PDU Session Re-establishment for DNN #1 is needed, the UE may transmit a PDU Session Establishment Request for DNN #1 to the AMF.

The UE may transmit a PDU Session Establishment Request only in a case where the Session Management message received in Step 2-2 does not include a back-off timer related to the DNN-based congestion control.

The PDU Session Establishment Request may include information for preventing a Reject of the PDU Session Establishment Request. That is, the UE may include, in the PDU Session Establishment Request, information for preventing the PDU Session Establishment Request from being rejected due to the DNN-based congestion control being applied to DNN #1.

In order to notify to the AMF and SMF 2 the transmission of a PDU Session Establishment Request, as a subsequent operation of the transmission of a Session Management message related to the SSC Mode performed by SMF 1, the UE may use the information for preventing the reject of the PDU Session Establish Request. SMF 2 is an SMF related to a new PDU session. For reference, although SMF 2 is illustrated as a separate entity from SMF 1 in the drawing, SMF 2 may be the same SMF as SMF 1, or SMF 2 may be a SMF that is different from SMF 1.

More specifically, the information for preventing reject (or rejection) may be used to enable the AMF to ignore (or disregard) the DNN-based congestion control being applied to DNN #1, and to transmit a PDU Session Establishment Request related to the new PDU session to an SMF (i.e., SMF 2) being related to the new PDU session.

Additionally, if the information for preventing reject (or rejection) is transmitted to SMF 2 by the AMF, the information for preventing reject (or rejection) may be used to enable SMF 2 to ignore (or disregard) the DNN-based congestion control being applied to DNN #1, and to accept the PDU Session Establishment Request.

The information for preventing reject (or rejection) of the PDU Session Establishment Request may include at least one of the following information from a to h.

- a: Information notifying that a PDU Session Establishment Request has been transmitted in relation with the SSC mode.
- b: Information notifying that SM signaling (including a PDU Session Establishment Request) has been initiated or has occurred upon request, i.e., information notifying that a PDU Session Establishment Request has been transmitted upon a request made by SMF 1.
- c: Information requesting not to apply DNN-based congestion control for DNN #1.
- d: (In case of SSC Mode 2) Information notifying that the PDU Session Establishment Request is transmitted after the existing (or old) PDU session for DNN #1 is released.
- e: (In case of SSC Mode 3) Information notifying that the existing (or old) PDU session for DNN #1 is released after the PDU Session Establishment Request is transmitted.
- f: Information notifying that the PDU Session Establishment Request is transmitted after a back-off timer related to DNN #1 is stopped. This information is transmitted in a case where the UE receives a Session Management message and stops the back-off timer.
- g: Information notifying that the DNN-based congestion control is overridden in DNN #1. This information may notify that the UE has transmitted the PDU Session request without stopping the back-off timer related to DNN #1.
- h: Information notifying a priority level of the PDU Session Establishment Request. This information may also be information notifying that the priority level of the PDU Session Establishment Request is high. This information may include a pre-configured priority level value or a priority level value being configured by the first SMF in the Session Management message.

In case the information for preventing reject (or rejection) includes information f, the information f may be used for enabling SMF 2 to transmit a PDU Session Establishment Request Accept message including a back-off timer related to DNN #1 in order to prevent other signaling for the congested DNN #1.

Meanwhile, in case the information for preventing reject (or rejection) includes information g, since the UE is still operating the back-off timer, SMF 2 does not need to include the back-off timer related to DNN #1 to the PDU Session Establishment Request Accept message.

In case the information for preventing reject (or rejection) includes information h, the information h may be used, by SMF 2, for determining whether or not to accept the PDU Session Establishment Request.

The information for preventing reject (or rejection) of the PDU Session Establishment Request may be included in the PDU Session Establishment Request and then transmitted. Alternatively, the information for preventing reject (or rejection) of the PDU Session Establishment Request may be included in an SM signaling including the PDU Session Establishment Request and may then be transmitted. For example, the information for preventing reject (or rejection) of the PDU Session Establishment Request may be included in N1 SM information, in Step 1 of FIG. 5a and FIG. 5b, and may then be transmitted. Alternatively, the information for preventing reject (or rejection) of the PDU Session Establishment Request may be included only in the MM signaling part including the SM signaling and may then be transmitted. Since the AMF does not verify the content of the N1 SM information included in the NAS message, this is to enable the AMF to also verify the information for preventing reject of the PDU Session. For example, the information for preventing reject (or rejection) of the PDU Session Establishment Request may be included in a part excluding the N1 SM information in the NAS message, in Step 1 of FIG. 5a and FIG. 5b, and may then be transmitted. Alternatively, the information for preventing reject (or rejection) of the PDU Session Establishment Request may be included in both the SM signaling and the MM signaling including SM signaling. For example, the information for preventing reject (or rejection) of the PDU Session Establishment Request may be included in the N1 SM information and in all parts excluding the N1 SM information in the NAS message, in Step 1 of FIG. 5a and FIG. 5b, and may then be transmitted.

3-2) The AMF may ignore (or disregard) the DNN-based congestion control for DNN #1 based on the information for preventing reject (or rejection) of the PDU Session Establishment Request. More specifically, in case the service provider also configures the AMF as a subject performing the DNN-based congestion control, the AMF may ignore (or disregard) the DNN-based congestion control for DNN #1 based on the information for preventing reject (or rejection) of the PDU Session Establishment Request. Thereafter, according to Step 2 of FIG. 5a and FIG. 5b, the AMF may select an SMF for a new PDU session related to DNN #1 as SMF 2.

3-3) The AMF may transmit a PDU Session Establishment Request to SMF 2. Herein, the PDU Session Establishment Request includes information for preventing reject (or rejection) of the PDU Session Establishment Request. Additionally, the AMF may notify that the SM signaling (a signal including the PDU Session Establishment Request) has been transmitted to SMF 2 and that the information for preventing reject (or rejection) of the PDU Session Establishment Request has been received.

3-4) SMF 2 may ignore (or disregard) the DNN-based congestion control being applied to DNN #1 based on the information for preventing reject (or rejection) of the PDU Session Establishment Request and may then accept the PDU Session Establishment Request. More specifically, SMF 2 may ignore (or disregard) the DNN-based congestion control being applied to DNN #1 and may perform Step 4a to Step 9b of FIG. 5a and FIG. 5b. For reference, in FIG. 8, UPF 2 may be a UPF selected by SMF 2 in accordance with Step 7 of FIG. 5a and FIG. 5b.

In case the information for preventing reject (or rejection) includes information notifying that the PDU Session Establishment Request is transmitted after stopping the back-off timer related to DNN #1 (information f of Step 3-1), in order to prevent signaling other than the PDU Session Establishment Request for DNN #1, SMF 2 may transmit a back-off timer related to DNN #1, to the UE, through the AMF. SMF 2 may include the back-off timer related to DNN #1 having the DNN-based congestion control applied thereto in the Session Establishment Accept message and may then transmit the message including the back-off timer.

In case the information for preventing reject (or rejection) includes information notifying that the DNN-based congestion control is overridden in DNN #1 (information g of Step 3-1), since the UE is operating a back-off timer related to DNN #1, SMF 2 does not transmit any additional back-off timer.

In case the information for preventing reject (or rejection) includes information notifying a priority level of the PDU Session Establishment Request, SMF 2 may determine whether or not to accept the PDU Session Establishment Request based on the priority level of the PDU Session Establishment Request. For example, in case the priority level of the PDU Session Establishment Request is higher than a pre-configured threshold value, SMF 2 may accept the PDU Session Establishment Request. Herein, the pre-configured threshold value may be differently configured depending upon the DNN. Additionally, the pre-configured threshold value may be differently configured depending upon a PDU Session ID of a PDU session related to DNN #1.

In case the SSC Mode of the existing (or old) PDU session related to DNN #1 is SSC Mode 3, even if the information for preventing reject (or rejection) includes information is not provided to SMF 2, in case the old PDU Session ID is included in the PDU Session Establishment Request, SMF 2 may not apply the DNN-based congestion control for DNN #1 based on the old PDU Session ID.

3-5) SMF 2 may transmit a PDU Session Establishment Accept message, to the UE, through the AMF. For example, SMF 2 may transmit a PDU Session Establishment Accept message, to the AMF, based on Step 10 of FIG. 5a and FIG. 5b.

3-6) The AMF may transmit the PDU Session Establishment Accept message, to the UE. The AMF may include the PDU Session Establishment Accept message in a NAS message and may then transmit the message to the UE.

If the PDU Session Establishment procedure is completed, the UE may transmit uplink data to UPF 2 by using a new PDU session related to DNN #1, and then the UE may receive downlink data from UPF 2.

According to the above-described disclosure of this specification, even if DNN-based congestion control is being applied to DNN #1, a new PDU session may be established for DNN #1. Accordingly, the UE may continuously be provided with services for DNN #1, and the network may continuously provide services for DNN #1 to the UE.

Hereinafter, referring to FIG. 9 and FIG. 10, examples of the disclosure of this specification related to SSC Mode 2 and SSC Mode 3 will be described in detail.

I-1. First Example: Execution Procedure of SSC Mode 2

Figure 9:
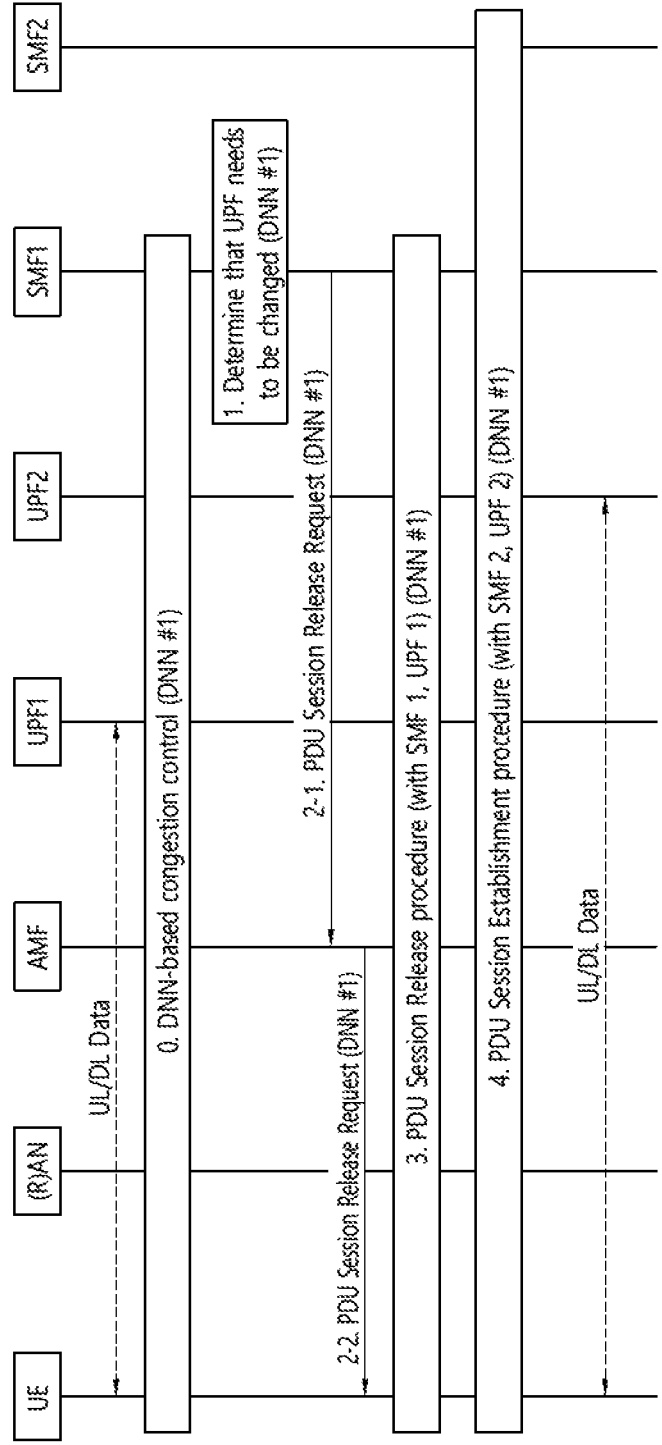
FIG. 9 is a flow chart showing a Session Management procedure of SSC Mode 2 according to the PDU Session Establishment procedure shown in FIG. 8.

FIG. 9 is a flow chart showing a Session Management procedure of SSC Mode 2 according to the PDU Session Establishment procedure shown in FIG. 8.

Hereinafter, a Session Management procedure SSC Mode 2, which is the SSC mode of the PDU session having the DNN-based congestion control applied thereto, will be described in detail with reference to FIG. 9. The Session Management procedure of FIG. 9 is performed based on the PDU Session Establishment procedure, which is described in FIG. 8, and overlapping description will be omitted for simplicity, and description will be made based only on the differences between the procedures.

0) In case DNN #1 is congested, the network applies DNN-based congestion control for DNN #1. SMF 1 may provide a back-off timer and information on DNN #1, to the UE, through an AMF.

1) SMF 1 may determine to change an anchor UPF (UPF 1) of the PDU session related to DNN #1 of the UE.

2-1, 2-2) In a situation where DNN-based congestion control is being applied for DNN #1, SMF 1 may transmit a Session Management message, to the UE, through the AMF. The Session Management message includes a PDU Session Release Request, and the PDU Session Release Request may be transmitted in the form of a PDU Session Release Command. The PDU Session Release Request may include a PDU Session ID and Cause information. Herein, the Cause information includes information indicating that a PDU Session Re-establishment for DNN #1 is needed.

The PDU Session Release Request may be included in N1 SM information. For example, the N1 SM information may be transmitted, by SMF 1, by using Namf_Communication_N1N2MessageTransfer. The Namf_Communication_N1N2MessageTransfer may include an N1 SM container (including PDU Session Release Command), Skip information, and N2 Resource Release Request (including PDU Session ID).

3) UE, (R)AN, AMF, UPF 1, and SMF 1 may perform a PDU Session Release procedure, which releases the old PDU session for DNN #1. The PDU Session Release procedure may be performed in accordance with the PDU Session Release procedure, which is defined in the 3GPP standard document TS 23.502, and the scope of the present disclosure includes all procedures of any methods for releasing the existing (or old) PDU session. If the PDU Session Release procedure is completed, the old PDU session related to DNN #1 is released. If the PDU Session Release procedure is completed, SMF 1 deletes all information on the old PDU session.

4) The UE may initiate a PDU Session Release procedure based on a Session Management message, which is received from SMF 1, through the AMF. The UE may generate a new PDU Session ID related to DNN #1 based on Cause information, which includes information indicating that a PDU Session Re-establishment for DNN #1 is needed, and a PDU Session Release Request, and, then, the UE may initiate the PDU Session Establishment procedure. The UE transmits the PDU Session Establishment Request, and then the PDU Session Establishment procedure is initiated. The PDU Session Establishment Request may include information for preventing a Reject of the PDU Session Establishment Request. That is, the UE may include, in the PDU Session Establishment Request, information for preventing the PDU Session Establishment Request from being rejected due to the DNN-based congestion control being applied to DNN #1. During the PDU Session Establishment procedure, the AMF may select an SMF (i.e., SMF 2) related to a new PDU session, and SMF 1 may select a UPF (i.e., UPF 2) related to a new PDU session. The AMF may ignore (or disregard) the DNN-based congestion control for DNN #1 based on the information for preventing reject (or rejection) of the PDU Session Establishment Request. SMF 2 may also ignore (or disregard) the DNN-based congestion control for DNN #1 based on the information for preventing reject (or rejection) of the PDU Session Establishment Request. Step 4 of FIG. 9 is included in the PDU Session Establishment procedure of FIG. 8 (including Step 3: Steps 3-1 to 3-6).

If the PDU Session Establishment procedure is completed, the UE may transmit uplink data to UPF 2 by using a new PDU session related to DNN #1 and may receive downlink data from UPF 2.

According to the Session Management procedure of FIG. 9, even if DNN-based congestion control for DNN #1 is being applied, a new PDU session for DNN #1 may be established. Accordingly, the UE may continuously be provided with services for DNN #1, and the network may continuously provide services for DNN #1 to the UE.

I-2. Second Example: Execution Procedure of SSC Mode 3

Figure 10:
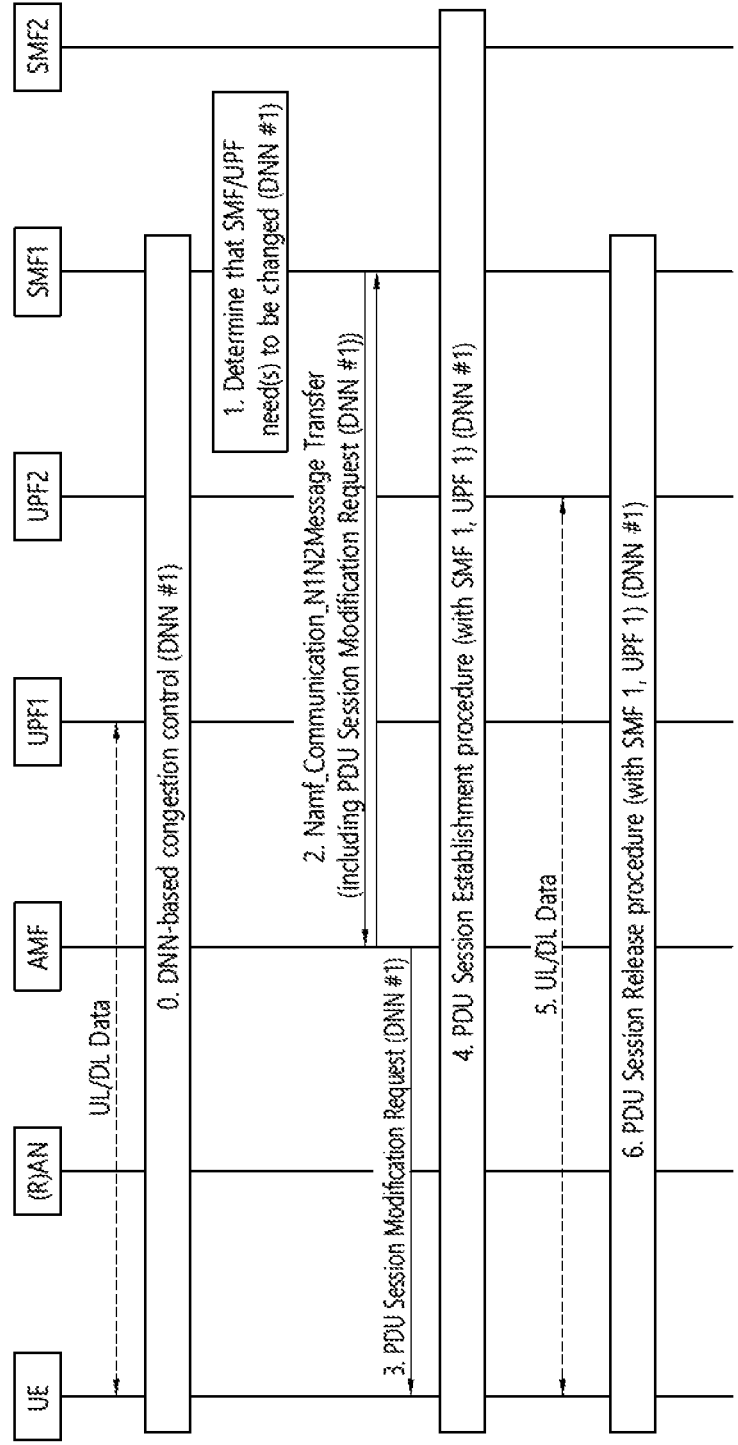
FIG. 10 is a flow chart showing a Session Management procedure of SSC Mode 3 according to the PDU Session Establishment procedure shown in FIG. 8.

FIG. 10 is a flow chart showing a Session Management procedure of SSC Mode 3 according to the PDU Session Establishment procedure shown in FIG. 8.

Hereinafter, a Session Management procedure SSC Mode 3, which is the SSC mode of the PDU session having the DNN-based congestion control applied thereto, will be described in detail with reference to FIG. 10. The Session Management procedure of FIG. 10 is performed based on the PDU Session Establishment procedure, which is described in FIG. 8, and overlapping description will be omitted for simplicity, and description will be made based only on the differences between the procedures.

0) In case DNN #1 is congested, the network applies DNN-based congestion control for DNN #1. SMF 1 may provide a back-off timer and information on DNN #1, to the UE, through an AMF.

1) SMF 1 may determine to change an anchor UPF (UPF 1) of the PDU session related to DNN #1 of the UE, or SMF 1 may determine to change an SMF (SMF 1) of the PDU session.

2) In a situation where DNN-based congestion control is being applied for DNN #1, SMF 1 may transmit a Session Management message to the AMF. The Session Management message may include a PDU Session Modification Request related to DNN #1, and the PDU Session Modification Request may include Cause information and a PDU Session Address Lifetime value.

The PDU Session Modification Request may be transmitted in the form of a PDU Session Modification Command. For example, SMF 1 may transmit the PDU Session Modification Request by using Namf_Communication_N1N2MessageTransfer. The Namf_Communication_N1N2MessageTransfer may include a PDU Session ID, SMF Reallocation Request information, and an N1 SM container. The N1 SM container may include a PDU Session Modification Request, and the PDU Session ID may indicate an old PDU session that needs to be relocated.

Additionally, the PDU Session Modification Request may also include PDU Session Release timer. The PDU Session Release timer may be a timer that is configured based on the PDU Session Address Lifetime value. The Cause information includes information indicating that a PDU Session Re-establishment for DNN #1 is needed. And, the PDU Session Address Lifetime value is a value indicating for how long the network will maintain the old PDU session for DNN #1. The SMF may operate the PDU Session Release timer in accordance with the PDU Session Address Lifetime value.

3) The AMF may transmit a PDU Session Modification Request related to DNN #1 to the UE. More specifically, the AMF may transmit the PDU Session Establishment Request by including the request in a NAS message. In case the PDU Session Release timer is included in the PDU Session Modification Request, the UE may provide the PDU Session Release timer to a higher layer.

4) The UE may initiate the PDU Session Establishment procedure based on the received PDU Session Modification Request. The UE transmits the PDU Session Establishment Request, and then the PDU Session Establishment procedure is initiated. The PDU Session Establishment Request may include information for preventing a Reject of the PDU Session Establishment Request. That is, the UE may include, in the PDU Session Establishment Request, information for preventing the PDU Session Establishment Request from being rejected due to the DNN-based congestion control being applied to DNN #1. The PDU Session Establishment Request procedure includes the PDU Session Establishment procedure of FIG. 8 (including Step 3: Steps 3-1 to 3-6).

In the PDU Session Establishment procedure, in response to step 1) of FIG. 5a and FIG. 5b, the UE may generate a new PDU Session ID related to DNN #1 in accordance with the SSC mode, and the UE may use the new PDU Session ID so as to transmit the PDU Session Establishment Request. The UE may transmit the PDU Session Establishment Request by including the request in a NAS Request message. The new PDU Session ID may be included in a PDU Session ID of the NAS Request message. And, the UE may transmit, to the AMF, the old PDU Session ID related to the old PDU session by including the old PDU Session ID in the NAS Request message.

During the PDU Session Establishment procedure, the AMF may ignore (or disregard) the DNN-based congestion control for DNN #1 based on the information for preventing reject (or rejection) of the PDU Session Establishment Request.

In response to step 2) of FIG. 5a and FIG. 5b, the AMF may select an SMF (i.e., SMF 2) that is different from SMF 1. In case the SMF is not changed, the AMF may transmit a PDU Session Establishment Request to an SMF (i.e., SMF 1) serving an old PDU Session ID. SMF 2 may ignore (or disregard) the DNN-based congestion control being applied to DNN #1 based on the information for preventing reject (or rejection) of the PDU Session Establishment Request.

In response to step 3) of FIG. 5a and FIG. 5b, the AMF may transmit, to SMF 2, a PDU Session Establishment Request after including a PDU Session ID (including a new PDU Session ID) and an Old PDU Session ID (including the existing (or old) PDU Session ID) in the corresponding request. The PDU Session Establishment Request may, for example, be included in Nsmf_PDUSession_CreateSMContext Request and may then be transmitted.

SMF 2 may detect that the PDU Session Establishment Request is related to the trigger of Step 2) based on the old PDU Session ID, which is included in the PDU Session Establishment Request. SMF 2 may store the new PDU Session ID and may select a new PDU Session Anchor (i.e., UPF 2), which is related to the new PDU session.

Meanwhile, even if the information for preventing reject (or rejection) is not provided, in case the old PDU Session ID is included in the received PDU Session Establishment Request, SMF 2 may not apply the DNN-based congestion control for DNN #1 based on the old PDU Session ID.

5) If the PDU Session Establishment Request is completed, the UE may transmit uplink data to UPF 2 by using the new PDU session related to DNN #1 and may receive downlink data from UPF 2. The UE may use an IP Address/Prefix that is related to the new PDU session for all of the new Traffic being related to DNN #1. Additionally, the UE may relocate, in advance, the old (or existing) traffic flow related to DNN #1 from the old PDU session to the new PDU session.

6) UE, (R)AN, AMF, UPF 1, and SMF 1 may perform a PDU Session Release procedure, which releases the old PDU session for DNN #1. The PDU Session Release procedure may be performed in accordance with the PDU Session Release procedure, which is defined in the 3GPP standard document TS 23.502, and the scope of the present disclosure includes all procedures of any methods for releasing the existing (or old) PDU session. The UE may initiate the PDU Session Release procedure, before the PDU Session Release timer is expired. For example, the UE may initiate the PDU Session Release procedure, if the UE integrates all traffic to the new PDU session, or if the old PDU session is no longer needed. Alternatively, if the PDU Session Release timer is expired, SMF 1 may initiate a PDU Session Release procedure related to DNN #1. If the PDU Session Release procedure is completed, SMF 1 deletes all information on the old PDU session. If the PDU Session Release procedure is completed, the old PDU session related to DNN #1 is released.

According to the Session Management procedure of FIG. 10, even if DNN-based congestion control for DNN #1 is being applied, a new PDU session for DNN #1 may be established. Accordingly, the UE may continuously be provided with services for DNN #1, and the network may continuously provide services for DNN #1 to the UE.

<Exemplary Operations of UE According to the Disclosure of This Specification>

Figure 11:
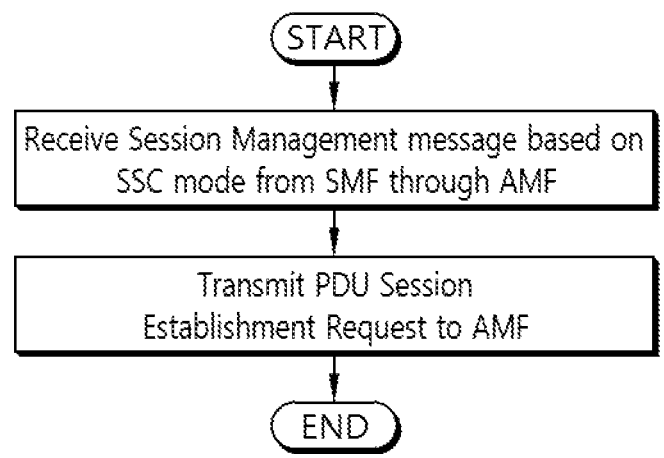
FIG. 11 is a flow chart showing exemplary operations performed by the UE in FIG. 8 to FIG. 10.

Referring to FIG. 11, examples of the operations of the UE according to the disclosure of this specification, which are described in FIG. 8 to FIG. 10, will be described in detail.

FIG. 11 is a flow chart showing exemplary operations performed by the UE in FIG. 8 to FIG. 10.

In a state where a back-off timer related to the DNN-based congestion control is being operated, the UE may receive a Session Management message, which is based on the SSC mode, from an SMF (i.e., SMF 1), through the AMF. The Session Management message is related to a DNN (i.e., DNN #1) to which the DNN-based congestion control is applied.

The UE may transmit, to the AMF, a PDU Session Establishment Request for the establishment of a new PDU session related to DNN #1, based on the Session Management message. The PDU Session Establishment Request includes information for preventing reject (or rejection) of the PDU Session Establishment Request. The information for preventing reject (or rejection) may be used to enable the AMF to ignore (or disregard) the DNN-based congestion control and to transmit the PDU Session Establishment Request to an SMF (i.e., SMF 2) being related to the new PDU session.

For reference, the operations of the UE shown in FIG. 11 are merely exemplary, and the UE may perform the process steps described in FIG. 8 to FIG. 10.

<Exemplary Operations of AMF According to the Disclosure of This Specification>

Figure 12:
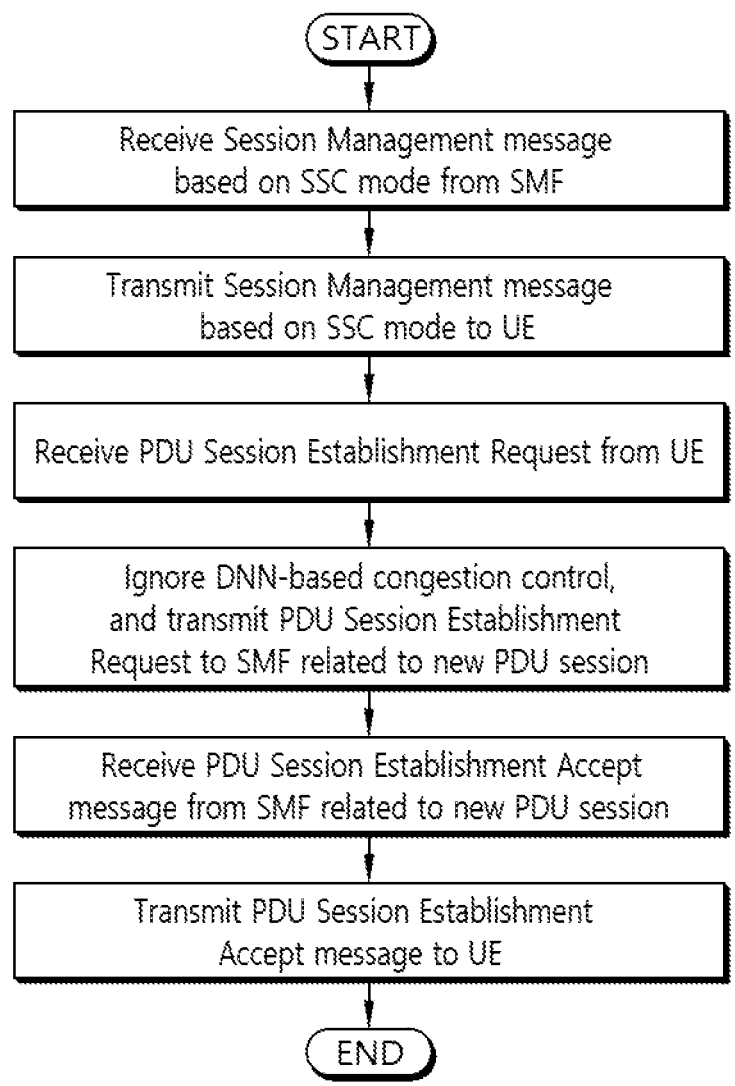
FIG. 12 is a flow chart showing exemplary operations performed by the AMF in FIG. 8 to FIG. 10.

FIG. 12 is a flow chart showing exemplary operations performed by the AMF in FIG. 8 to FIG. 10.

The AMF may receive a Session Management message, which is based on the SSC mode, from a first SMF (i.e., SMF 1). The Session Management message is related to a DNN (i.e., DNN #1) to which the DNN-based congestion control is applied.

The AMF may transmit a Session Management message, which is based on the SSC mode, to the UE.

After the UE receives the Session Management message, the AMF may receive a PDU Session Establishment Request from the UE. The PDU Session Establishment Request is a request being transmitted for the establishment of a new PDU session related to DNN #1. The PDU Session Establishment Request includes information for preventing reject (or rejection) of the PDU Session Establishment Request.

The AMF may ignore (or disregard) the DNN-based congestion control being applied to DNN #1, based on the information for preventing reject (or rejection) of the PDU Session Establishment Request. And, the AMF may select an SMF (i.e., SMF 2) being related to the new PDU session for DNN #1. The AMF may transmit a PDU Session Establishment Request to the SMF (i.e., SMF 2) being related to the selected new PDU session. The PDU Session Establishment Request being transmitted to the SMF related to the new PDU session includes information for preventing reject (or rejection) of the PDU Session Establishment Request.

After the SMF related to the new PDU session receives the PDU Session Establishment Request, the AMF may receive a PDU Session Establishment Accept message from the SMF related to the new PDU session.

Accordingly, the AMF may transmit a PDU Session Establishment Accept message to the UE.

For reference, the operations of the AMF shown in FIG. 12 are merely exemplary, and the AMF may perform the process steps described in FIG. 8 to FIG. 10.

<Exemplary Operations of SMF According to the Disclosure of This Specification>

Figure 13:
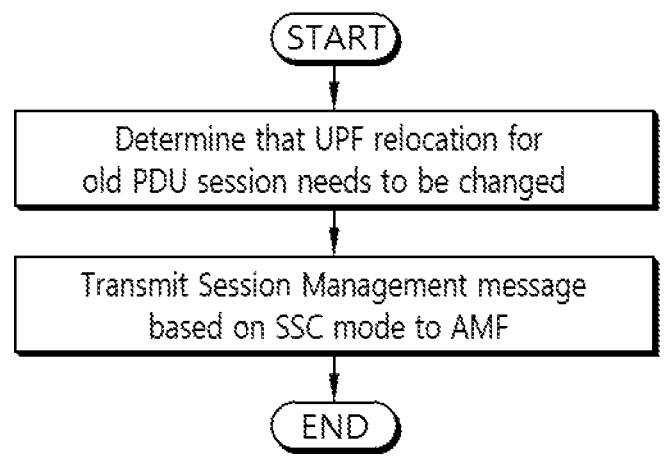
FIG. 13 is a flow chart showing exemplary operations performed by the SMF in FIG. 8 to FIG. 10.

FIG. 13 is a flow chart showing exemplary operations performed by the SMF in FIG. 8 to FIG. 10.

The SMF (i.e., SMF 1) may determine that a UPF (i.e., UPF 1) of the old PDU session related to DNN #1 does not need to be changed. More specifically, the SMF may determine that at least one of the UPF of the old PDU session related to DNN #1 and the SMF (i.e., SMF 1) of the old PDU session needs to be changed. For example, in case useful events occur when the UPF is changed, SMF 1 may determine that the UPF needs to be changed.

Accordingly, the SMF may transmit a Session Management message, which is based on the SSC mode, to the AMF. Even if the DNN-based congestion control for DNN #1 is being applied, the SMF may transmit the Session Management message without including the back-off timer in the Session Management message. In case the SSC Mode of the old PDU Session is SSC Mode 2, the Session Management message may include a PDU Session Release Request. And, in case the SSC Mode of the old PDU Session is SSC Mode 3, the Session Management message may include a PDU Session Modification Request.

For reference, the operations of the SMF shown in FIG. 13 are merely exemplary, and the SMF may perform the process steps described in FIG. 8 to FIG. 10.

<Exemplary Operations of SMF Related to a New PDU Session According to the Disclosure of This Specification>

Figure 14:
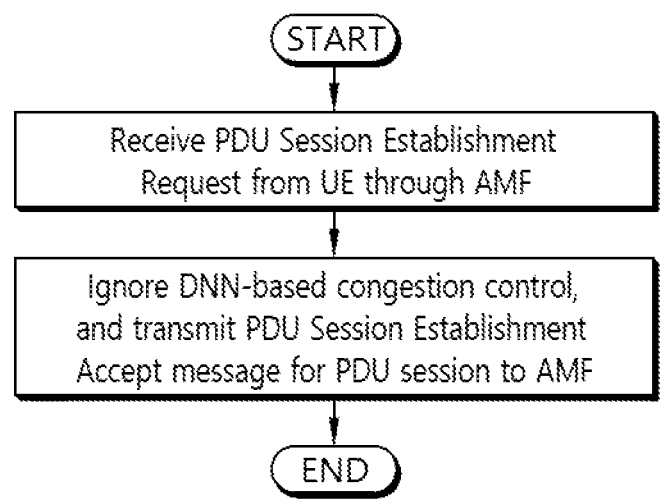
FIG. 14 is a flow chart showing exemplary operations performed by the SMF being related to a new PDU session in FIG. 8 to FIG. 10.

FIG. 14 is a flow chart showing exemplary operations performed by the SMF being related to a new PDU session in FIG. 8 to FIG. 10.

In a situation where a back-off timer related to the DNN-based congestion control, which is configured by the service provider, is being operated, an SMF (i.e., SMF 2) being related to a new PDU session may receive a PDU Session Establishment Request from the UE, through the AMF. The PDU Session Establishment Request is related to a DNN (i.e., DNN #1) having the DNN-based congestion control applied thereto. Additionally, the PDU Session Establishment Request include information for preventing reject (or rejection) of the PDU Session Establishment Request.

The SMF being related to the new PDU session may ignore (or disregard) the DNN-based congestion control being related to DNN #1, based on the information for preventing reject (or rejection) of the PDU Session Establishment Request. And, SMF 2 may transmit a PDU Session Establishment Accept message for the new PDU session to the AMF.

In case the SMF related to the new PDU session and the SMF having transmitted a Session message are the same, the SMF related to the new PDU session may perform all of the operations related to FIG. 13 and the operations related to FIG. 14.

For reference, the operations of the SMF related to the new PDU session shown in FIG. 14 are merely exemplary, and the SMF related to the new PDU session may perform the process steps described in FIG. 8 to FIG. 10.

Figure 15:
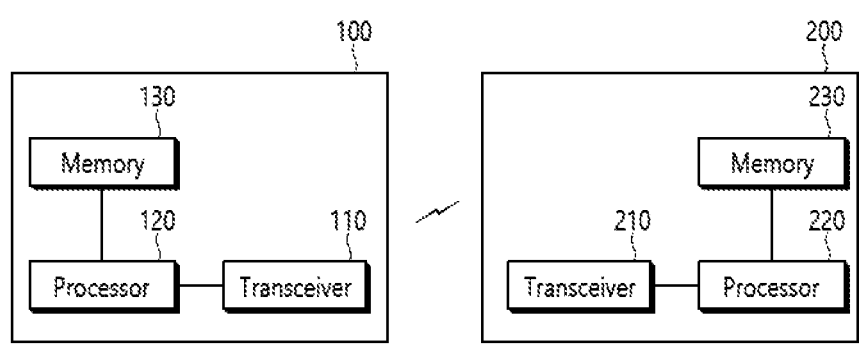
FIG. 15 is a block diagram showing a wireless device and a network node in which a disclosure of this specification is implemented.

FIG. 15 is a block diagram showing a wireless device and a network node in which a disclosure of this specification is implemented.

Referring to FIG. 15, a wireless device (100) and a network node (200) may implement the disclosure of this specification. The wireless device (100) may be the UE that is described in the disclosure of this specification. And, the network node (200) may be SMF 1, SMF 2, AMF, first UPF, and second UPF that are described in the disclosure of this specification.

As shown in the drawing, the wireless device (100) includes a processor (120), a memory (130), and a transceiver (110). Similarly, as shown in the drawing, the base station (200) includes a processor (220), a memory (230), and a transceiver (210). The processors (120, 220), the memories (130, 230), and the transceivers (110, 210) may each be implemented as a separate chip or at least two or more blocks/functions may be implemented by a single chip.

The transceiver (110, 210) includes a transmitter and a receiver. In case a specific operation is being performed, any one of the transmitter and the receiver may be operated, or both the transmitter and the receiver may be operated. The transceiver (110, 210) may include one or more antennas transmitting and/or receiving radio signals. Additionally, the transceiver (110, 210) may include an amplifier that is used for amplifying a reception signal and/or a transmission signal, and a band-pass filter that is used for performing transmission to a specific frequency band.

The processor (120, 220) may implement the functions, processes, and/or methods that are proposed in this specification. The processor (120, 220) may include an encoder and a decoder. For example, the processor (120, 220) may perform the operations according to the description presented above. The above-described processor (120, 220) may include an application-specific integrated circuit (ASIC), another chip set, a logical circuit, a data processing device, and/or a converter converting a baseband signal and a radio signal to and from one another.

The memory (130, 230) may include a read-only memory (ROM), a random access memory (RAM), a flash memory, a memory card, a storage medium, and/or another storage device.

Figure 16:
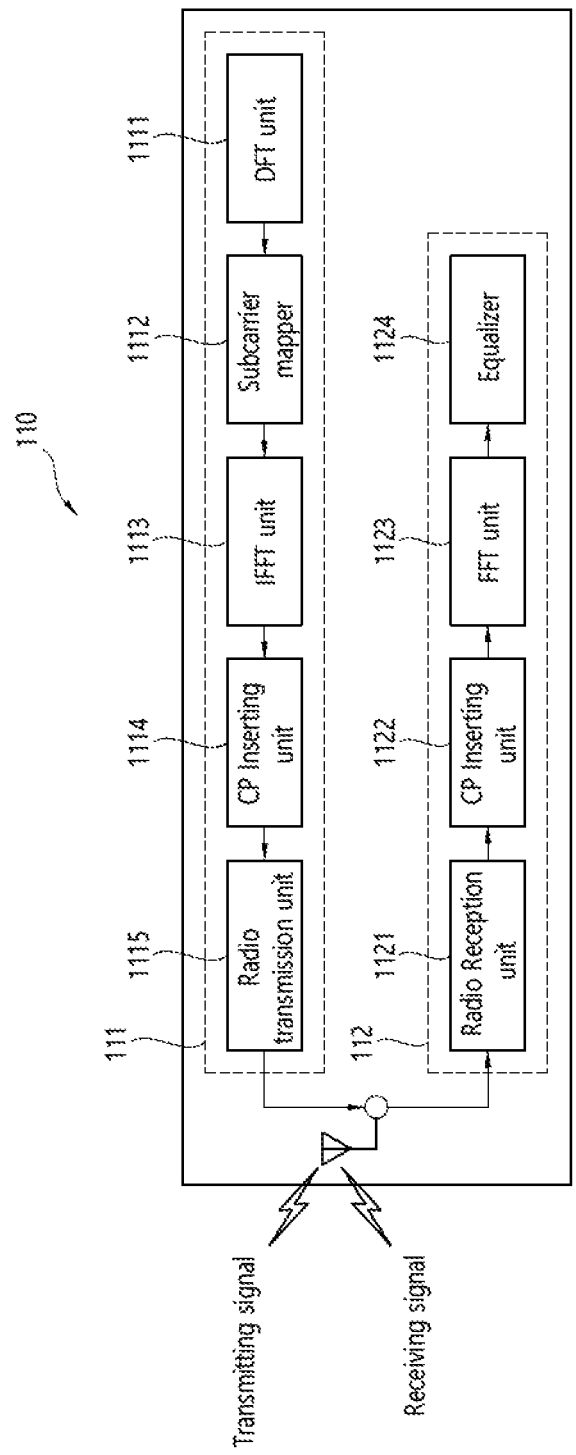
FIG. 16 is a detailed block diagram of a transceiver included in the wireless device shown in FIG. 15.

FIG. 16 is a detailed block diagram of a transceiver included in the wireless device shown in FIG. 15.

Referring to FIG. 16, the transceiver (110) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). More specifically, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The subcarrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

The processor may include an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, and so on). The module is stored in the memory and may be executed by the processor. The memory may exist inside or outside the processor and may be connected to the processor in various known means.

In the above exemplary systems, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A method for performing, by a user equipment (UE), a PDU Session Establishment procedure, the method comprising:

in a situation where a back-off timer related to Data Network Name (DNN)-based congestion control is being operated, receiving, from a Session Management Function (SMF), through an Access and Mobility Management Function (AMF), a Session Management message being based on a Session and Service Continuity (SSC) mode, wherein the Session Management message is related to a DNN having the DNN-based congestion control applied thereto; and transmitting, to the AMF, a PDU Session Establishment Request for establishing a new PDU session related to the DNN, based on the Session Management message, wherein the PDU Session Establishment Request includes information for preventing a rejection of the PDU Session Establishment Request, and wherein the information for preventing the rejection is used for enabling the AMF to ignore the DNN-based congestion control and to transmit, to an SMF being related to a new PDU session, a PDU Session Establishment Request, wherein the information for preventing the rejection includes at least one of (i) information notifying that the PDU Session Establishment Request has been transmitted in relation with the SSC mode, (ii) information notifying that the PDU Session Establishment Request has been transmitted upon a request made by the SMF, (iii) information requesting not to apply the DNN-based congestion control for the DNN, (iv) information notifying that the PDU Session Establishment Request is transmitted after an old PDU session for the DNN is released, (v) information notifying that the old PDU session for the DNN is released after the PDU Session Establishment Request is transmitted, (vi) information notifying that the PDU Session Establishment Request is transmitted after the back-off timer related is stopped, (vii) information notifying that the DNN-based congestion control is overridden, or (viii) information notifying a priority level of the PDU Session Establishment Request.

2. The method of claim 1, wherein, based on that the information for preventing the rejection is transmitted, by the AMF, to an SMF related to the new PDU session, the information for preventing the rejection is used to enable the SMF related to the new PDU session to ignore the DNN-based congestion control and to accept the PDU Session Establishment Request.

3. The method of claim 1, wherein, in case the SSC mode is SSC Mode 2 in which the PDU Session Establishment procedure is performed after a PDU Session Release procedure, the Session Management message includes a PDU Session Release Request, and wherein, in case the SSC mode is SSC Mode 3 in which the PDU Session Release procedure is performed after the PDU Session Establishment procedure, the Session Management message includes a PDU Session Release Request.

4. The method of claim 1, wherein the PDU Session Establishment Request is transmitted, to the AMF, in a case where the Session Management message does not include another back-off timer being related to the DNN-based congestion control.

5. The method of claim 1, further comprising:
receiving, from the SMF related to the new PDU session, through the AMF, a PDU Session establishment Accept message for the new PDU session.

6. The method of claim 1, further comprising:
in case the information for preventing the rejection includes information notifying that the PDU Session Establishment Request is transmitted after the back-off timer related is stopped, receiving, from the SMF related to the new PDU session, through the AMF, another back-off timer being related to the DNN-based congestion control.

7. The method of claim 1, wherein the information notifying a priority level of the PDU Session Establishment Request includes a pre-configured priority level value or a priority level value being configured, by the SMF, in the Session Management message, and wherein the information notifying a priority level of the PDU Session Establishment Request is used, by the SMF related to the new PDU session, for determining whether or not to accept the PDU Session Establishment Request.

8. A user equipment (UE) configured to perform a PDU Session Establishment procedure, the UE comprising:
a transceiver; and
a processor configured to control the transceiver, wherein the processor is configured to:
receive, in a situation where a back-off timer related to Data Network Name (DNN)-based congestion control is being operated, from a Session Management Function (SMF), through an Access and Mobility Management Function (AMF), a Session Management message being based on a Session and Service Continuity (SSC) mode, wherein the Session Management message is related to a DNN having the DNN-based congestion control applied thereto, and transmit, to the AMF, a PDU Session Establishment Request for establishing a new PDU session related to the DNN, based on the Session Management message, wherein the PDU Session Establishment Request includes information for preventing a rejection of the PDU Session Establishment Request, and wherein the information for preventing the rejection is used for enabling the AMF to ignore the DNN-based congestion control and to transmit, to an SMF being related to a new PDU session, a PDU Session Establishment Request, wherein the information for preventing the rejection includes at least one of (i) information notifying that the PDU Session Establishment Request has been transmitted in relation with the SSC mode, (ii) information notifying that the PDU Session Establishment Request has been transmitted upon a request made by the SMF, (iii) information requesting not to apply the DNN-based congestion control for the DNN, (iv) information notifying that the PDU Session Establishment Request is transmitted after an old PDU session for the DNN is released, (v) information notifying that the old PDU session for the DNN is released after the PDU Session Establishment Request is transmitted, (vi) information notifying that the PDU Session Establishment Request is transmitted after the back-off timer related is stopped, (vii) information notifying that the DNN-based congestion control is overridden, or (viii) information notifying a priority level of the PDU Session Establishment Request.

9. The UE of claim 8, wherein, based on that the information for preventing the rejection is transmitted, by the AMF, to an SMF related to the new PDU session, the information for preventing the rejection is used to enable the SMF related to the new PDU session to ignore the DNN-based congestion control and to accept the PDU Session Establishment Request.

10. The UE of claim 8, wherein, in case the SSC mode is SSC Mode 2 in which the PDU Session Establishment procedure is performed after a PDU Session Release procedure, the Session Management message includes a PDU Session Release Request, and wherein, in case the SSC mode is SSC Mode 3 in which the PDU Session Release procedure is performed after the PDU Session Establishment procedure, the Session Management message includes a PDU Session Release Request.

11. The UE of claim 8, wherein the PDU Session Establishment Request is transmitted, to the AMF, in a case where the Session Management message does not include another back-off timer being related to the DNN-based congestion control.

12. A method for performing, by a Session Management Function (SMF), a PDU Session Establishment procedure, the method comprising:

in a situation where a back-off timer related to Data Network Name (DNN)-based congestion control configured by a service provider is being operated, receiving, from a user equipment (UE), through an Access and Mobility Management Function (AMF), a PDU Session Establishment Request for establishing a PDU session related to a DNN having the DNN-based congestion control applied thereto, wherein the PDU Session Establishment Request includes information for preventing the rejection of the PDU Session Establishment Request; and ignoring the DNN-based congestion control based on the information for preventing the rejection, and transmitting, to the AMF, a PDU Session Establishment Accept message for the PDU session, wherein the information for preventing the rejection includes at least one of (i) information notifying that the PDU Session Establishment Request has been transmitted in relation with a Session and Service Continuity (SSC) mode, (ii) information notifying that the PDU Session Establishment Request has been transmitted upon a request made by the SMF, (iii) information requesting not to apply the DNN-based congestion control for the DNN, (iv) information notifying that the PDU Session Establishment Request is transmitted after an old PDU session for the DNN is released, (v) information notifying that the old PDU session for the DNN is released after the PDU Session Establishment Request is transmitted, (vi) information notifying that the PDU Session Establishment Request is transmitted after the back-off timer related is stopped, (vii) information notifying that the DNN-based congestion control is overridden, or (viii) information notifying a priority level of the PDU Session Establishment Request.

* * * * *